(12) United States Patent
Park et al.

(10) Patent No.: US 9,386,556 B2
(45) Date of Patent: Jul. 5, 2016

(54) METHOD AND APPARATUS FOR OPTIMIZING A LIMITED FEEDBACK IN A WIRELESS ACCESS SYSTEM SUPPORTING A DISTRIBUTED ANTENNA (DA) TECHNIQUE

(71) Applicants: LG ELECTRONICS INC., Seoul (KR); KOREA UNIVERSITY RESEARCH & BUSINESS FOUNDATION, Seoul (KR)

(72) Inventors: Eunsung Park, Seoul (KR); Inkyu Lee, Seoul (KR); Wookbong Lee, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 14/377,287

(22) PCT Filed: Feb. 21, 2013

(86) PCT No.: PCT/KR2013/001396
§ 371 (c)(1),
(2) Date: Aug. 7, 2014

(87) PCT Pub. No.: WO2013/125882
PCT Pub. Date: Aug. 29, 2013

(65) Prior Publication Data
US 2015/0009929 A1     Jan. 8, 2015

Related U.S. Application Data

(60) Provisional application No. 61/601,037, filed on Feb. 21, 2012.

(51) Int. Cl.
*H04W 64/00* (2009.01)
*H04B 7/02* (2006.01)
(Continued)

(52) U.S. Cl.
CPC ............ *H04W 64/006* (2013.01); *H04B 7/024* (2013.01); *H04B 7/0658* (2013.01);
(Continued)

(58) Field of Classification Search
CPC . H04W 64/006; H04W 24/08; H04W 72/042; H04B 7/024; H04B 7/0658; H04L 1/0088; H04L 5/001; H04L 5/0023; H04L 5/0057; H04L 5/0091; H04L 5/0055; H04L 27/2633; H04L 27/2636; H04L 1/0013; H04L 1/0057
See application file for complete search history.

(56) References Cited

U.S. PATENT DOCUMENTS

| 8,971,962 | B2 * | 3/2015 | Miyoshi | ............... | H04B 7/0413 |
| | | | | | 455/562.1 |
| 2008/0137145 | A1 * | 6/2008 | Takemura | ............ | H04N 1/4052 |
| | | | | | 358/3.03 |

(Continued)

FOREIGN PATENT DOCUMENTS

KR     10-2011-0138979 A     12/2011

OTHER PUBLICATIONS

Yu, Seungpyo et al., "Adaptive Bit Allocation Methods for Multi-cell Joint Processing Systems with Limited Feedback", IEEE 22nd International Symposium on Personal, Indoor and Mobile Radio Communications, 2011, pp. 2045-2049.

*Primary Examiner* — Ajay Cattungal
(74) *Attorney, Agent, or Firm* — Dentons US LLP

(57) ABSTRACT

The present invention relates to a wireless access system, and more particularly, to a method and apparatus for optimizing a limited feedback in a distributed antenna systems (DSAs). In one aspect of the present invention, a method for optimizing a limited feedback in a wireless access system supporting a distributed antenna (DA) technique, the method comprises steps of receiving, a user equipment (UE) from a DA port, information related to a transmission power of the DA port; receiving a downlink signal from the DA port; measuring a distance between the UE and the DA port by using the downlink signal from the DA port; calculating a number of feedback bits based on the information of the transmission power and the distance between the UE and the DA port; and transmitting feedback information using the calculated number of feedback bits.

8 Claims, 26 Drawing Sheets

(51) Int. Cl.
  *H04B 7/06* (2006.01)
  *H04W 24/08* (2009.01)
  *H04W 72/04* (2009.01)
  *H04L 5/00* (2006.01)
  *H04L 27/26* (2006.01)
  *H04L 1/00* (2006.01)

(52) U.S. Cl.
  CPC ............ *H04L 1/0088* (2013.01); *H04W 24/08* (2013.01); *H04W 72/042* (2013.01); *H04L 1/0013* (2013.01); *H04L 1/0057* (2013.01); *H04L 5/001* (2013.01); *H04L 5/0023* (2013.01); *H04L 5/0055* (2013.01); *H04L 5/0057* (2013.01); *H04L 5/0091* (2013.01); *H04L 27/2633* (2013.01); *H04L 27/2636* (2013.01)

(56) References Cited

U.S. PATENT DOCUMENTS

| | | |
|---|---|---|
| 2008/0317145 A1 | 12/2008 | Clerckx et al. |
| 2010/0105333 A1 | 4/2010 | Ge et al. |
| 2010/0220652 A1* | 9/2010 | Ishii ..................... H04L 5/0007 370/328 |
| 2011/0230224 A1 | 9/2011 | Larsson et al. |
| 2012/0002593 A1* | 1/2012 | Kim ...................... H04L 1/1854 370/315 |
| 2012/0002631 A1* | 1/2012 | Nishio ................... H04L 5/001 370/329 |
| 2012/0020323 A1* | 1/2012 | Noh ........................ H04J 13/00 370/330 |
| 2012/0026955 A1* | 2/2012 | Benjebbour ........... H04B 7/024 370/329 |
| 2012/0027110 A1* | 2/2012 | Han ...................... H04J 11/0079 375/260 |
| 2012/0033575 A1 | 2/2012 | Zhang et al. |
| 2012/0052899 A1* | 3/2012 | Wang .................. H04W 52/226 455/513 |
| 2012/0069803 A1* | 3/2012 | Iwamura ........... H04W 72/1278 370/329 |
| 2012/0087324 A1* | 4/2012 | Kiyoshima ........... H04W 52/58 370/329 |
| 2012/0087427 A1* | 4/2012 | Noh ...................... H04B 7/0613 375/260 |
| 2012/0207145 A1* | 8/2012 | Han ...................... H04B 7/024 370/342 |
| 2012/0258723 A1* | 10/2012 | Kim ...................... H04W 48/08 455/452.1 |

* cited by examiner

FIG. 5
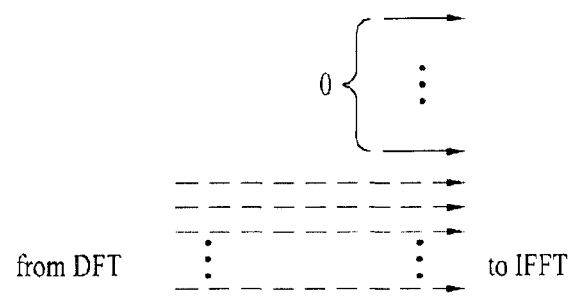
(a)
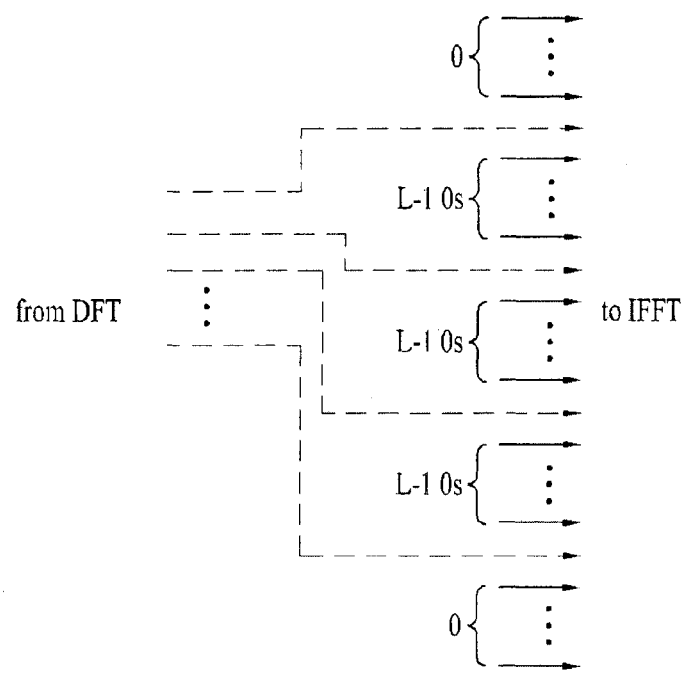
(b)

FIG. 6
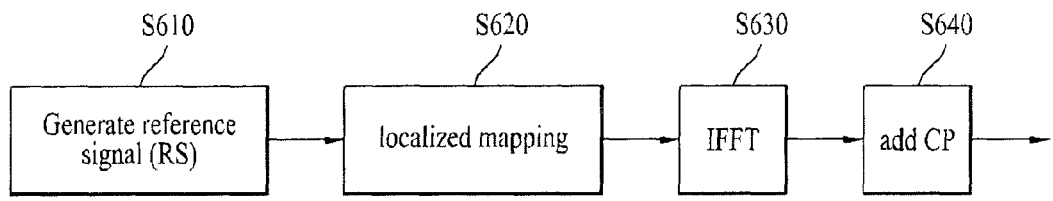
FIG. 7
Normal CP
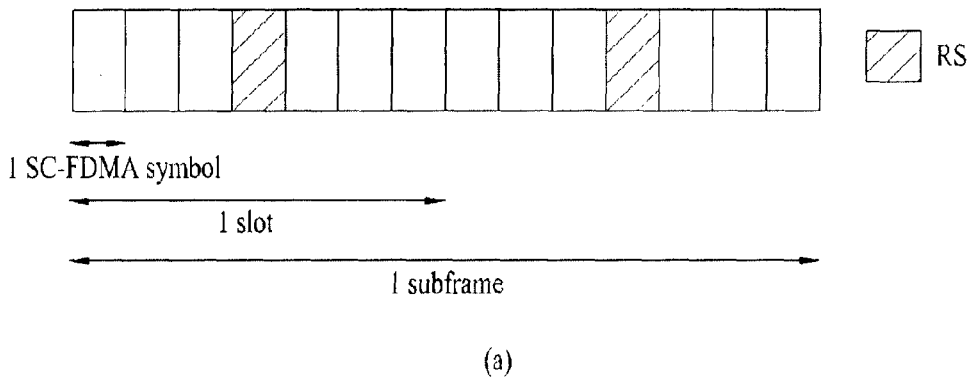
(a)
Extended CP
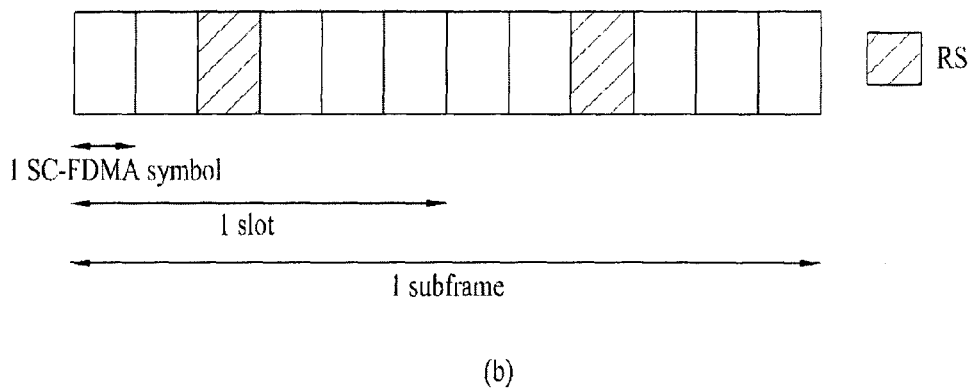
(b)

METHOD AND APPARATUS FOR OPTIMIZING A LIMITED FEEDBACK IN A WIRELESS ACCESS SYSTEM SUPPORTING A DISTRIBUTED ANTENNA (DA) TECHNIQUE

This application is a 35 USC §371 National Stage entry of International Application No. PCT/KR2013/001396, filed on Feb. 21, 2013, and claims priority to U.S. Provisional Application No. 61/601,037, filed Feb. 21, 2012, both of which are hereby incorporated by reference in their entireties as if fully set forth herein.

TECHNICAL FIELD

The present invention relates to a wireless access system, and more particularly, to a method and apparatus for optimizing a limited feedback in a distributed antenna systems (DSAs).

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In recent years, distributed antenna systems (DASs) have gained interests because of its ability to extend the cell coverage and increase the system capacity. Unlike conventional centralized antenna systems (CASs) where all antennas are co-located at the cell center, distributed antenna (DA) ports in the DAS are separated geographically. Thus, the DAS can reduce the access distance along with the transmit power and co-channel interference, which results in improved cell-edge performance.

For conventional closed-loop CAS where channel state information (CSI) at the transmitter is utilized, optimization on power allocation and a precoding design have been heavily conducted. However, only a few papers have studied the closed-loop DAS. In DAS, an achievable capacity expression was derived with analytical closed forms for spatial multiplexing transmission. Also, conventional art (e.g., MIMO channel capacity for the distributed antenna systems) studied the capacity of DAS with the random antenna layout in a single-cell and proposed a sub-optimal power allocation scheme. In addition, a sectorized distributed antenna structure was introduced and a power adjusted beam switching scheme was proposed.

In practical limited feedback systems, each user first quantizes instantaneous channel realizations and feeds back the index of the quantized channel to the transmitter by using a codebook. For multiple-input multiple-output (MIMO) CAS, a codebook design problem was first solved by utilizing a distribution of the optimal beamforming vector in independent and identically distributed (i.i.d.) Rayleigh fading matrix channels. Also, several papers studied feedback bit allocation schemes for the conventional CAS with limited feedback. The article (e.g., L. Dai, S. Zhou, and Y. Yao, "Capacity Analysis in CDMA distributed antenna systems") provided various issues of DAS with limited feedback focusing on the challenges in codebook designs and proposed a suboptimal codebook design suitable for the DAS. However, the methods and apparatus of the conventional studies waste feedback information and radio resources because these methods and apparatus consider so many factors of realization channels.

DETAILED DESCRIPTION OF THE INVENTION

Technical Problems

Accordingly, the present invention is directed to methods and apparatuses for optimizing a limited feedback in a distributed antenna systems (DSAs), which substantially obviates one or more of the problems due to limitations and disadvantages of the related art.

The objection of the present invention is to propose a new algorithm which allocates feedback bits for multi-user downlink DAS with limited feedback in single-cell environments in order to enhance the average sum rate. We consider per-DA port power constraint and employ composite fading channels with small scale fading and path loss.

For this purpose, firstly, we derive a lower bound of the expected signal-to-interference plus noise ratio (SINR) under the assumption of random quantization codebooks at each user, i.e. random vector quantization (RVQ). Then, we propose an adaptive feedback bit allocation algorithm which maximizes the lower bound of the expected SINR for each user.

Another object of the present invention is to provide a user equipment (UE) and/or a base station apparatus for supporting the above-described methods.

Technical problems to be solved by the present invention are not limited to the above-mentioned technical problem, and other technical problems not mentioned above can be clearly understood by one skilled in the art from the following description.

Technical Solutions

The present invention relates to a method and apparatus for optimizing a limited feedback in a distributed antenna systems (DSAs).

In one aspect of the present invention, a method for optimizing a limited feedback in a wireless access system supporting a distributed antenna (DA) technique, the method comprises steps of receiving, a user equipment (UE) from a DA port, information related to a transmission power of the DA port; receiving a downlink signal from the DA port; measuring a distance between the UE and the DA port by using the downlink signal from the DA port; calculating a number of feedback bits based on the information of the transmission power and the distance between the UE and the DA port; and transmitting feedback information using the calculated number of feedback bits.

The number of feedback bits may be a fixed value in the wireless access system.

The information related to the transmission power may be transmitted through a physical downlink control channel (PDCCH) signal. In this case, the PDCCH signal further comprises a number of transmission antennas of the DA port, and the number of transmission antennas is further considered for calculating the number of feedback bits.

The method may further comprise steps of measuring first channel status information between the UE and the DA port; and measuring second channel status information among the UE and other DA ports. In this case, the first channel status information and the second channel status information are transmitted using the number of feedback bits.

In another aspect of the present invention, a method for optimizing a limited feedback in a wireless access system supporting a distributed antenna (DA) technique, the method comprises steps of transmitting, from a DA port to a user equipment (UE), information related to a transmission power of the DA port; transmitting a downlink signal to the UE; and receiving feedback information transmitted with a fixed number of feedback bits. In this case, the fixed number of feedback bits is calculates based on a distance between the UE and the DA port and the information related to the transmission power of the DA port.

The information related to the transmission power may be transmitted through a physical downlink control channel (PDCCH) signal. In this case, the PDCCH signal further comprises a number of transmission antennas of the DA port, and the number of transmission antennas is further considered for calculation the number of feedback bits.

The feedback information may comprise first channel status information between the UE and the DA ports and second channel status information between the UE and other DA ports.

In another aspect of the present invention, a user equipment (UE) for supporting an optimization of a limited feedback in a wireless access system which supports a distributed antenna (DA) technique, the UE comprises a transmission module, a reception module, and a processor for performing the limited feedback. In this case, the processor is configured to receive, via the reception module from a DA port, information related to a transmission power of the DA port and a downlink signal; measure a distance between the UE and the DA port by using the downlink signal from the DA port; calculate a number of feedback bits based on the information of the transmission power and the distance between the UE and the DA port; and transmit, via the transmission module to the DA port, feedback information using the calculated number of feedback bits.

The number of feedback bits may be a fixed value in the wireless access system.

The information related to the transmission power may be transmitted through a physical downlink control channel (PDCCH) signal. In this case, the PDCCH signal further comprises a number of transmission antennas of the DA port, and the number of transmission antennas is further considered for calculating the number of feedback bits.

The processor may be further configured to: measure first channel status information between the UE and the DA port; and measure second channel status information among the UE and other DA ports. In this case, the first channel status information and the second channel status information are transmitted using the number of feedback bits.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

First of all a user equipment and a base station can efficiently transmit or receive feedback information, by using the new algorithm which allocates feedback bits for multi-user downlink DAS with limited feedback in single-cell environments.

Second, simulation results demonstrate that DAS with the proposed feedback bit allocation algorithm outperforms the system which allocates equal bits for the desired link and the interfering link (see FIGS. 22-25).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 is a view referred to for describing a signal mapping method in a frequency domain to satisfy single carrier properties in the frequency domain;

FIG. 6 is a block diagram for describing a reference signal transmission procedure for demodulating a transmit signal according to SC-FDMA;

FIG. 7 shows a symbol position to which a reference signal is mapped in a subframe structure according to SC-FDMA;

BEST MODE FOR CARRYING OUT THE INVENTION

Figure 1:
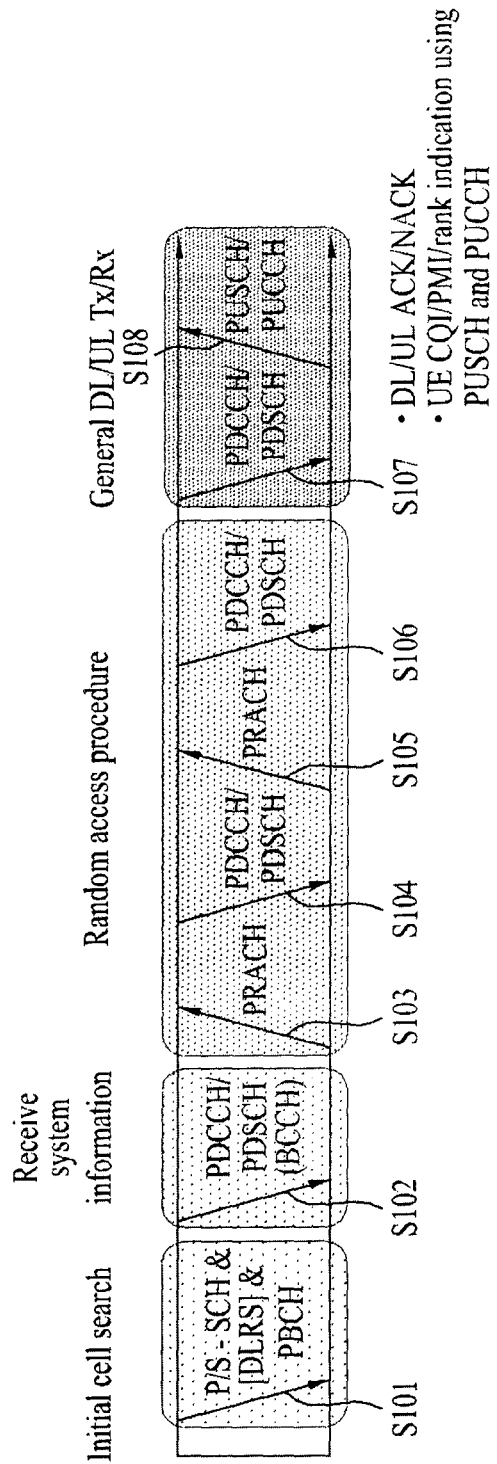
FIG. 1 is a view referred to for describing physical channels used in a 3GPP LTE system and a general signal transmission method using the physical channels.

Exemplary embodiments of the present invention provide a method and apparatus for optimizing a limited feedback in a distributed antenna systems (DSAs).

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided least it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 36.211, 3GPP TS 36.212, 3GPP TS 36.213, and 3GPP TS 36.321 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

Throughout this paper, bold lower case letters denote vectors, and the superscripts $(\cdot)^H$ and $(\cdot)^{-1}$ stand for Hermitian and the inverse operation, respectively. Also, $E(\cdot)$ represents expectation.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems. However, this is merely exemplary and the present invention can be applied to IEEE 802.16e/m systems.

1. 3GPP LTE/LTE-A System

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

FIG. 1 is a view referred to for describing physical channels used in a 3GPP LTE system and a signal transmission method using the same.

When a UE is powered on or newly enters a cell, the UE performs an initial cell search operation including synchronization with a BS in S101. To implement this, the UE receives a primary synchronization channel (P-SCH) and a secondary synchronization channel (S-SCH) to synchronize with the BS and acquires information such as cell ID.

Then, the UE can acquire broadcast information in the cell by receiving a physical broadcast channel (PBCH) signal from the BS. The UE can receive a downlink reference signal (DL RS) in the initial cell search operation to check a downlink channel state.

Upon completion of the initial cell search, the UE receives a physical downlink control channel (PDCCH) and a physical downlink shared channel (PDSCH) according to PDCCH information to acquire more detailed system information in S102.

Subsequently, the UE can perform a random access procedure, S103 to S106, in order to complete access to the BS. To achieve this, the UE transmits a preamble through a physical random access channel (PRACH) (S103) and receives a response message to the preamble through a PDCCH and a PDSCH corresponding to the PDCCH (S104). In the case of contention-based random access, the UE can perform a contention resolution procedure of transmitting an additional PRACH signal (S105) and receiving a PDCCH signal and a PDSCH signal corresponding to the PDCCH signal (S106).

Upon completion of the random access procedure, the UE can perform a general uplink/downlink signal transmission procedure of receiving a PDCCH signal and/or a PDSCH signal (S107) and transmitting a physical uplink shared channel (PUSCH) and/or a physical uplink control channel (PUCCH) (S108).

Control information transmitted from a UE to a BS is referred to as uplink control information (UCI). UCI includes HARQ-ACK/NACK (Hybrid Automatic Repeat and request Acknowledgement/Negative-ACK), SR (Scheduling Request), CQI (Channel Quality Indication), PMI (Precoding Matrix Indicator), RI (Rank Information), etc.

In the LTE system, UCI is periodically transmitted through a PUCCH, in general. However, UCI can be transmitted through a PUSCH when control information and traffic data need to be simultaneously transmitted. In addition, UCI can be non-periodically transmitted through a PUSCH at the request/instruction of a network.

Figure 2:
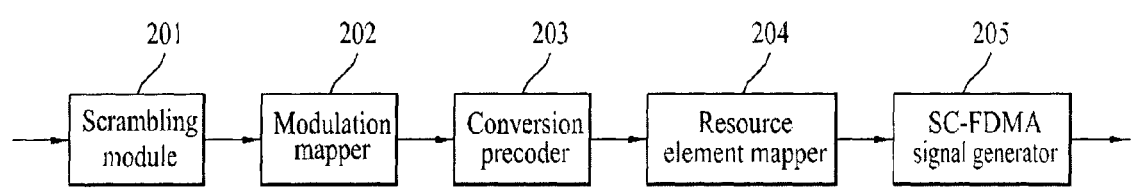
FIG. 2 illustrates a configuration of a user equipment (UE) and a signal processing procedure for transmitting an uplink signal.

FIG. 2 is a view referred to for describing a configuration of a UE and a signal processing procedure of the UE to transmit an uplink signal.

To transmit an uplink signal, a scrambling module 210 of the UE can scramble a transmitted signal using a UE-specific scramble signal. The scrambled signal is input to a modulation mapper 202 and modulated into a complex symbol using BPSK (Binary Phase Shift Keying), QPSK (Quadrature Phase Shift Keying), or 16QAM/64QAM (Quadrature Amplitude Modulation). The complex symbol is processed by a conversion precoder 203 and applied to a resource element mapper 204. The resource element mapper 204 can map the complex symbol to a time-frequency resource element. The signal processed in this manner can be transmitted to the BS through an antenna via an SC-FDMA signal generator 205.

Figure 3:
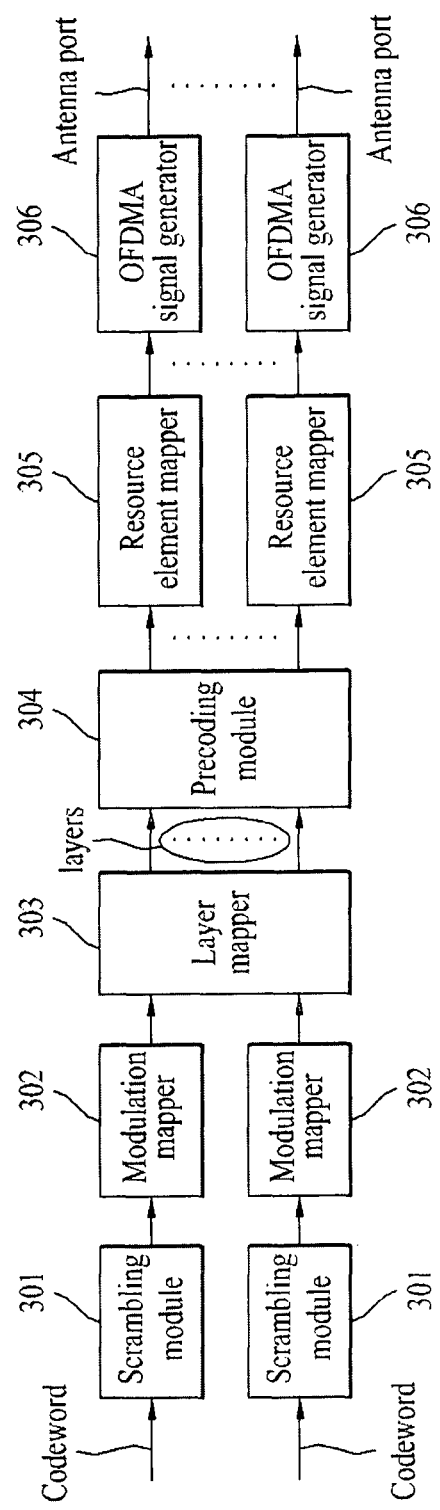
FIG. 3 illustrates a configuration of a base station (BS) and a signal processing procedure for transmitting a downlink signal.

FIG. 3 is a view referred to for describing a configuration of a BS and a signal processing procedure of the BS to transmit a downlink signal.

In a 3GPP LTE system, the BS can transmit one or more codewords through a downlink. Each codeword can be processed into a complex symbol through a scrambling module 301 and a modulation mapper 302 as in the uplink shown in FIG. 2. The complex symbol is mapped by a layer mapper 303 to a plurality of layers each of which can be multiplied by a precoding matrix by a precoding module 304 to be allocated to each transmit antenna. A transmission signal for each antenna, processed as above, is mapped by a resource element mapper 305 to a time-frequency resource element. The mapped signal is subjected to an OFDM signal generator 306 and transmitted through each antenna.

When a UE transmits a signal on uplink in a radio communication system, PAPR (Peak-to-Average Ratio) becomes a problem, compared to a case in which a BS transmits a signal on downlink. Accordingly, SC-FDMA is used for uplink signal transmission, as described above with reference to FIGS. 2 and 3, while OFDMA is used for downlink signal transmission.

Figure 4:
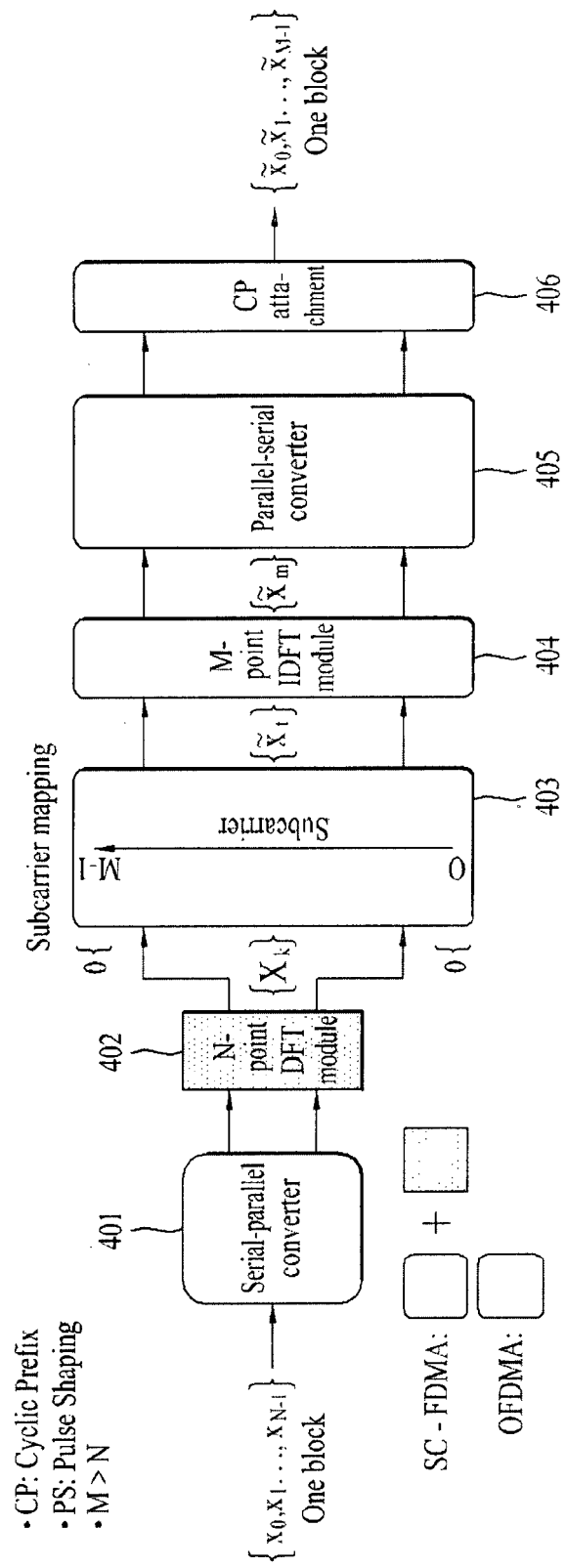
FIG. 4 is a view referred to for describing a configuration of a UE and SC-FDMA and OFDMA schemes.

FIG. 4 is a view referred to for describing a configuration of a UE and SC-FDMA and OFDMA.

A 3GPP system (e.g. LTE system) employs OFDMA on downlink and uses SC-FDMA on uplink. Referring to FIG. 4, both a UE for uplink signal transmission and a BS for downlink signal transmission include a serial-to-parallel converter 401, a subcarrier mapper 403, an M-point IDFT module 404, and a cyclic prefix (CP) addition module 406.

The UE for transmitting a signal through SC-FDMA additionally includes an N-point DFT module 402. The N-point DFT module 402 offsets the influence of IDFT of the M-point IDFT module 404 on a transmission signal such that the transmission signal has single carrier properties.

FIG. 5 illustrates a signal mapping method in a frequency domain to satisfy single carrier properties in the frequency domain.

FIG. 5(a) represents a localized mapping method and FIG. 5(b) represents a distributed mapping method. Clustered SC-FDMA, which is a modified version of SC-FDMA, classifies DFT process output samples into sub-groups and discretely maps the sub-groups to the frequency domain (or subcarrier domain) during a subcarrier mapping procedure.

FIG. 6 is a block diagram illustrating a procedure of transmitting a reference signal (RS) for demodulating a transmission signal according to SC-FDMA.

The LTE standard (e.g. 3GPP release 9) defines that an RS is generated in a frequency domain (S610) without being subjected to DFT, mapped to a subcarrier (S620), IFFT-processed (S630), subjected to CP attachment (S640), and then transmitted while data is transmitted in such a manner that a signal generated in a time domain is converted to a frequency domain signal through DFT, mapped to a subcarrier, IFFT-processed, and then transmitted (refer to FIG. 4).

FIG. 7 shows a symbol position to which an RS is mapped in a subframe structure according to SC-FDMA.

FIG. 7(a) shows an RS located at the fourth SC-FDMA symbol in each of two slots in one subframe in the case of normal CP. FIG. 7(b) shows an RS located at the third SC-FDMA symbol of each of two slots in one subframe in the case of extended CP.

Figure 8:
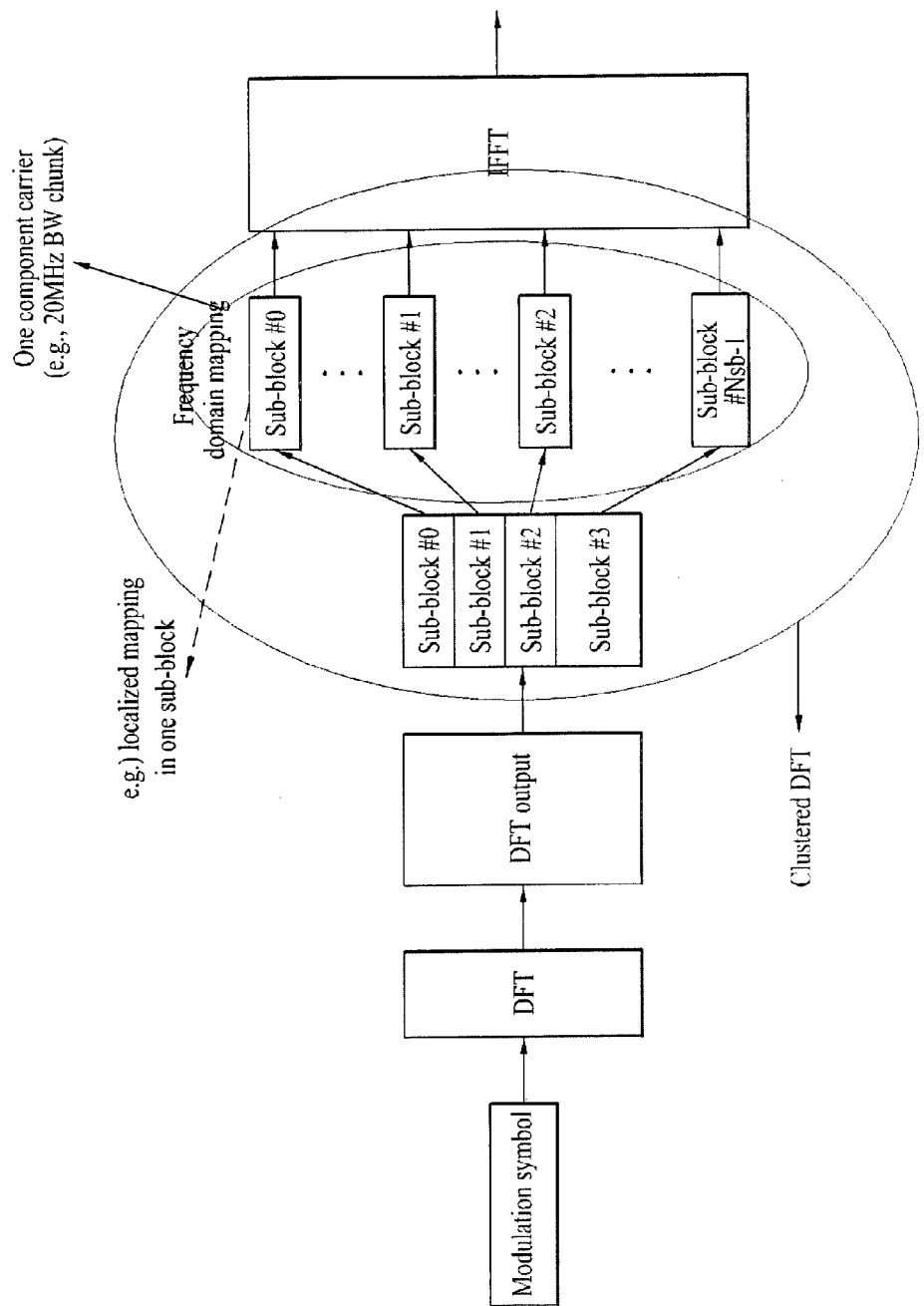
FIG. 8 shows a signal processing procedure for mapping DFT process output samples to a single carrier in clustered SC-FDMA.
Figure 9:
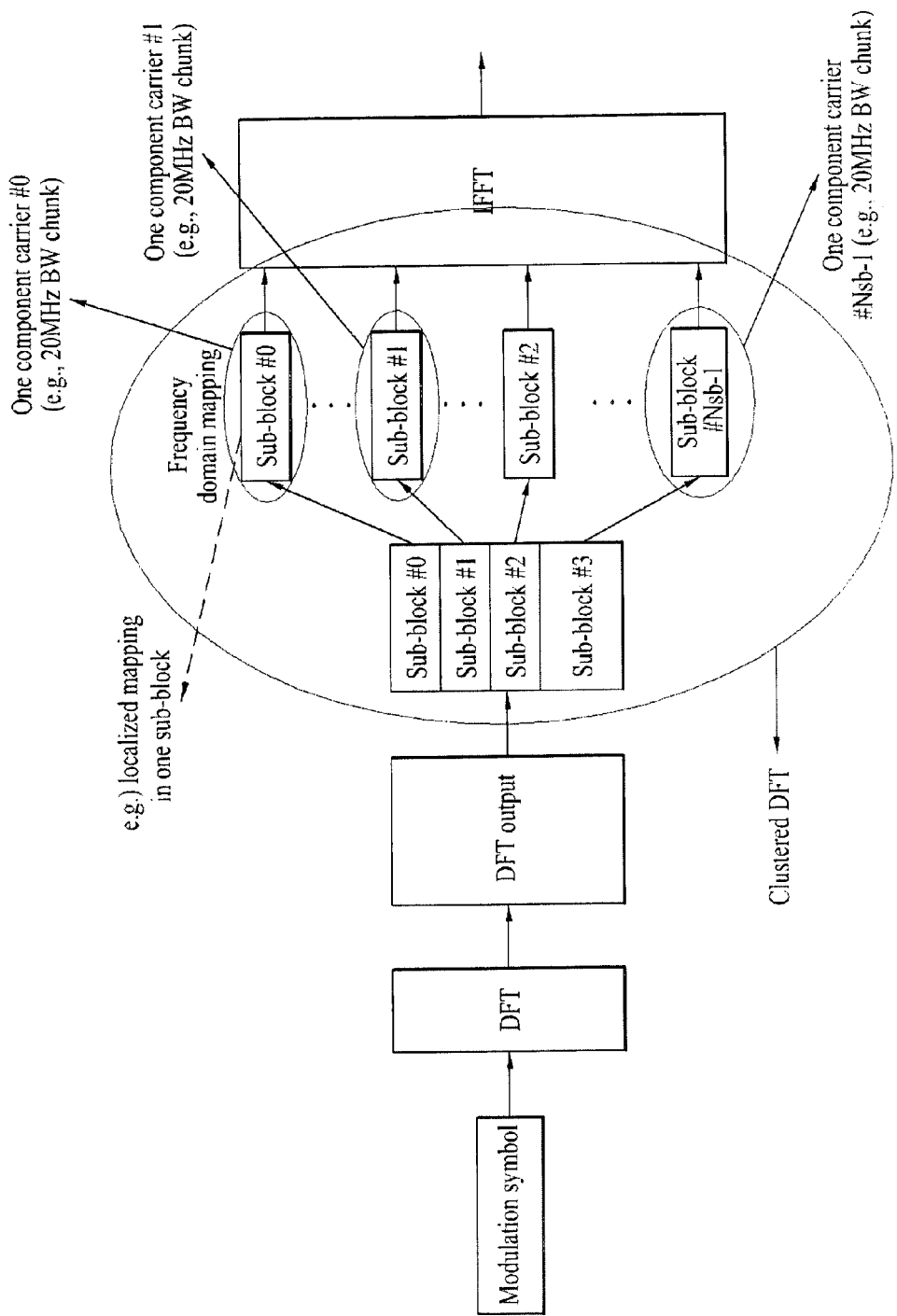
FIGS. 9 and 10 show a signal processing procedure for mapping DFT process output samples to multiple carriers in clustered SC-FDMA.
Figure 10:
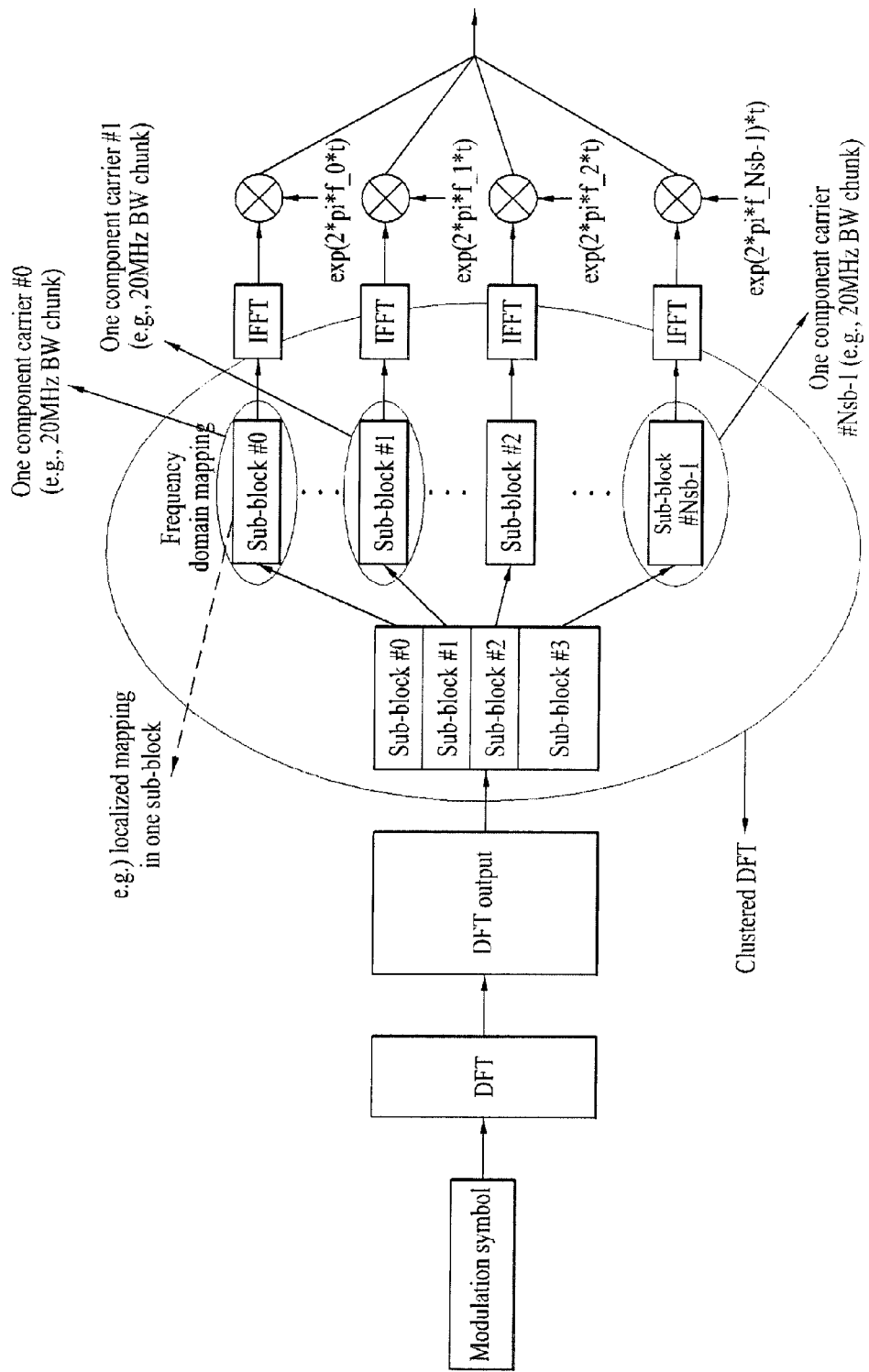

FIG. 8 illustrates a signal processing procedure of mapping DFT process output samples to a single carrier in clustered SC-FDMA and FIGS. 9 and 10 illustrate a signal processing procedure of mapping DFT process output samples to multiple carriers in clustered SC-FDMA.

FIG. 8 shows an example to which intra-carrier clustered SC-FDMA is applied and FIGS. 9 and 10 show an example to which inter-carrier clustered SC-FDMA is applied. FIG. 9 shows a case in which a signal is generated through a single IFFT block when subcarrier spacing between neighboring component carriers is aligned and component carriers are contiguously allocated in the frequency domain. FIG. 10 shows a case in which a signal is generated through a plurality of IFFT blocks when component carriers are non-contiguously allocated in the frequency domain.

Figure 11:
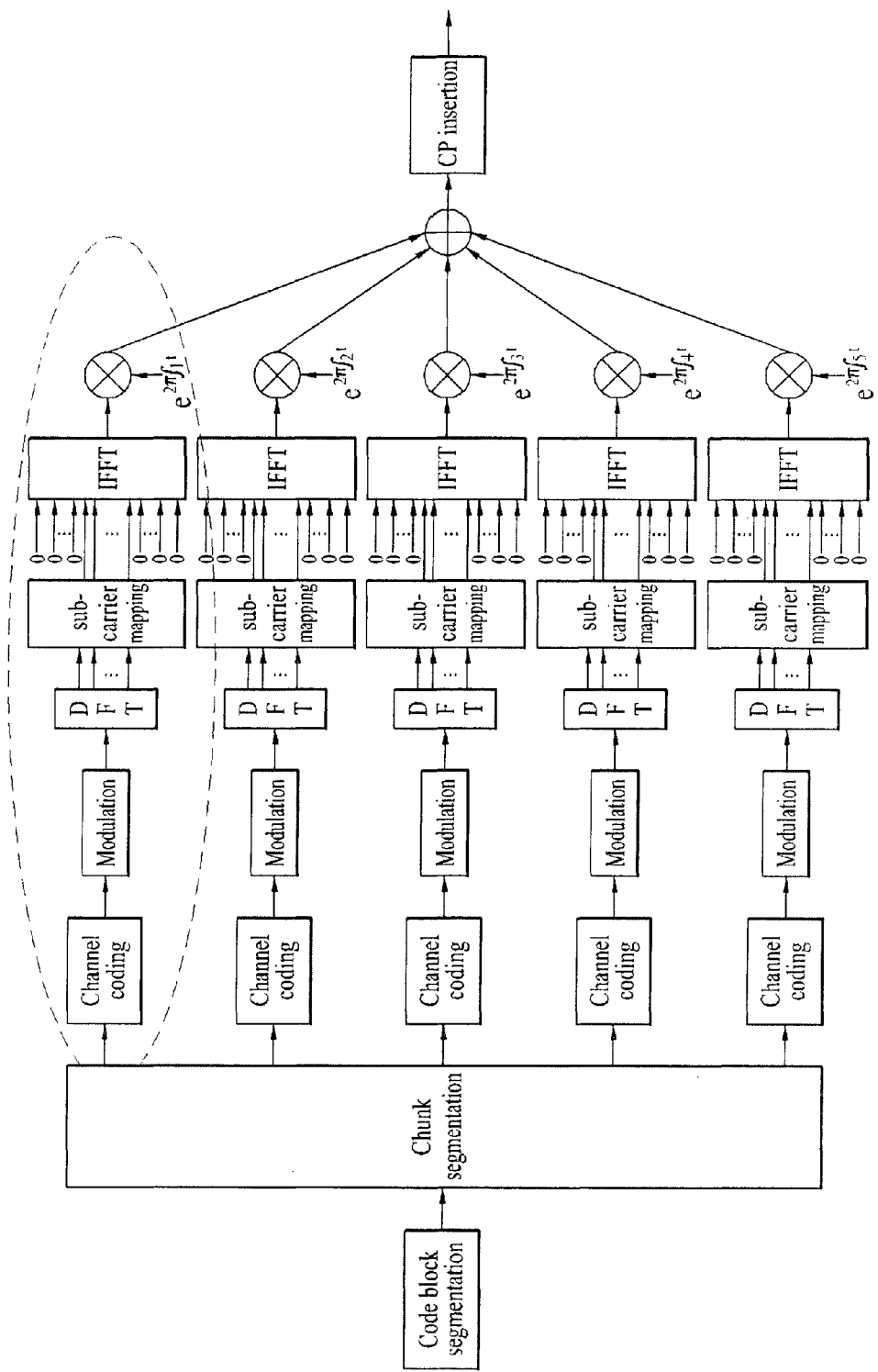
FIG. 11 shows a signal processing procedure of segmented SC-FDMA.

FIG. 11 illustrates a signal processing procedure of segmented SC-FDMA.

Segmented SC-FDMA employs as many IFFTs as the number of DFTs such that DFT and IFFT has one-to-one relationship to extend DFT spread and frequency subcarrier mapping of IFFT of SC-FDMA and may be referred to as NxSC-FDMA or NxDFT-s-OFDMA. The term segmented SC-FDMA is used in the specification. Referring to FIG. 11, the segmented SC-FDMA groups time domain modulation symbols into N (N being an integer greater than 1) groups and performs a DFT process group by group in order to relieve the single carrier property condition.

Figure 12:
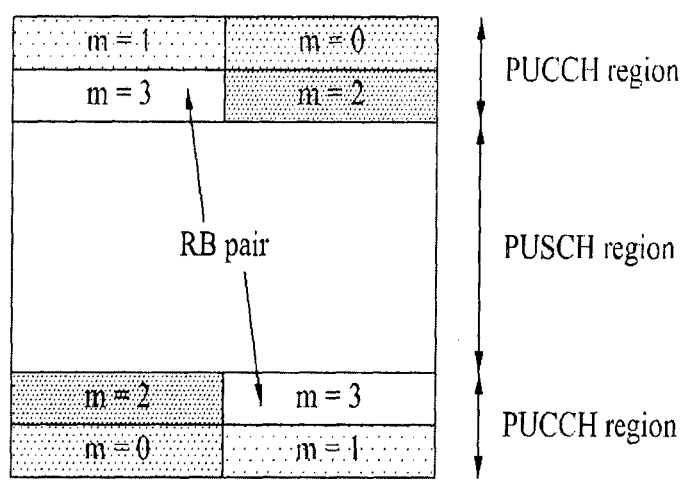
FIG. 12 illustrates a structure of an uplink subframe that can be used in embodiments of the present invention.

FIG. 12 shows a structure of an uplink subframe that can be used in embodiments of the present invention.

Referring to FIG. 12, the uplink subframe includes a plurality of slots (e.g. two slots). The number of SC-FDMA symbols included in each slot may depend on CP length. For example, a slot can include 7 SC-FDMA symbols in the case of normal CP.

The uplink subframe is segmented into a data region and a control region. The data region, which is for transmitting and receiving a PUSCH signal, is used to transmit an uplink data signal such as audio data. The control region, which is for transmitting and receiving a PUCCH signal, is used to transmit UCI.

PUCCH includes RB pairs (e.g. m=0, 1, 2, 3) located at both ends of the data region (e.g. RB pairs located at frequency mirrored portions) in the frequency domain and hopped on the basis of a slot. UCI includes HARQ ACK/NACK, channel quality information (CQI), precoding matrix indicator (PMI), rank indication (RI) information, etc.

Figure 13:
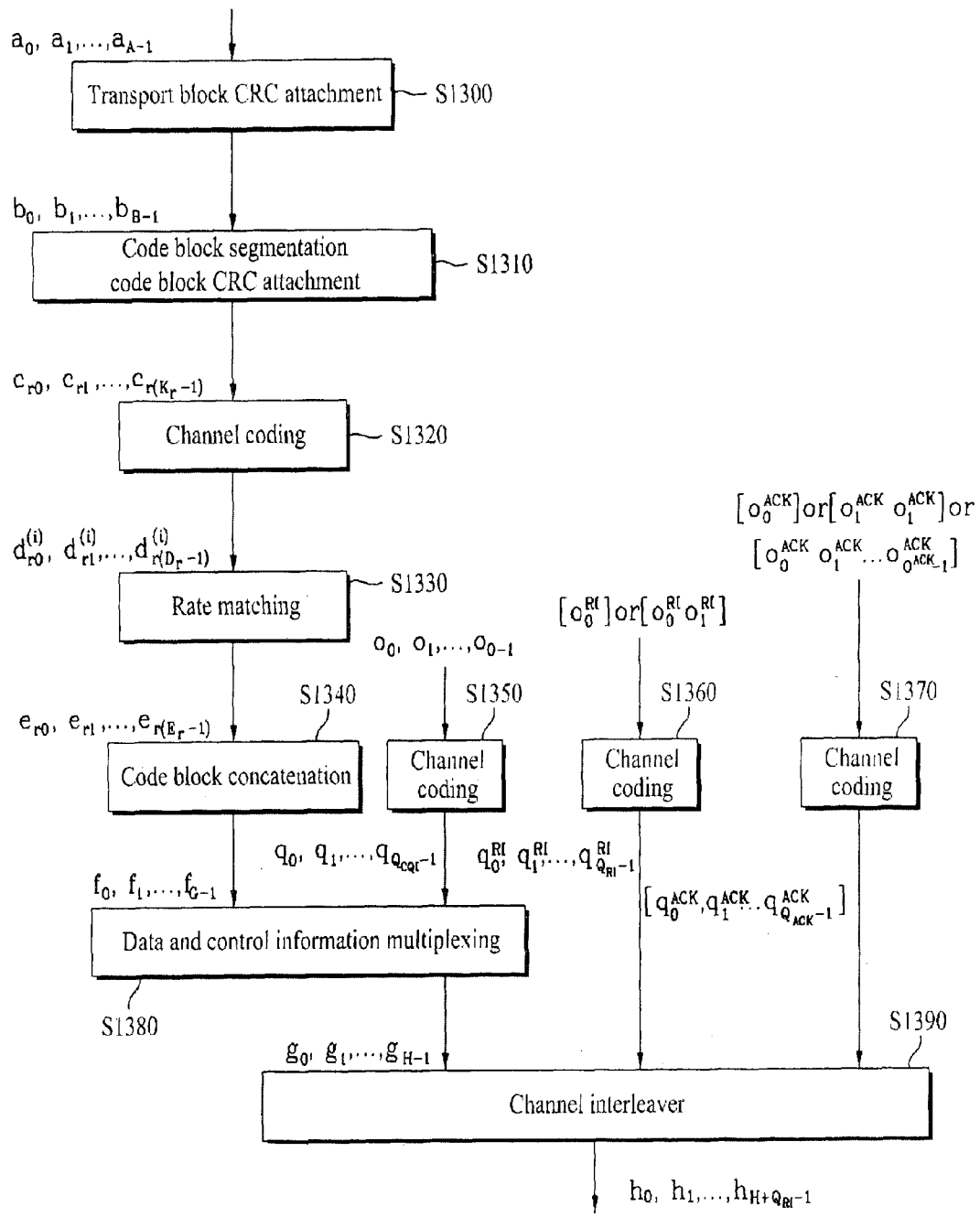
FIG. 13 illustrates a procedure of processing UL-SCH data and control information that can be used in embodiments of the present invention.

FIG. 13 illustrates a procedure of processing UL-SCH data and control information which can be used in the embodiments of the present invention.

Referring to FIG. 13, data transmitted through an UL-SCH is delivered in the form of a transport block (TB) to a coding unit for each transmission time interval (TTI).

Parity bits $p_0, p_1, p_2, p_3, \ldots, p_{L-1}$ are added to bits $a_0, a_1, a_2, a_3, \ldots, a_{A-1}$ of a TB received from a higher layer. Here, the size of the TB is A and the number of the parity bits is 24 (L=24). Input bits having a CRC attached thereto may be represented as $b_0, b_1, b_2, b_3, \ldots, b_{B-1}$ where B denotes the number of bits of the TB including the CRC (S1300).

The input bits $b_0, b_1, b_2, b_3, \ldots, b_{B-1}$ are segmented into code blocks (CBs) according to the TB size and a CRC is attached to each of the segmented CBs to obtain bits $c_{r0}, c_{r1}, c_{r2}, c_{r3}, \ldots, c_{r(K_r-1)}$. Here, r denotes a CB number (r=0, ..., C-1), $K_r$ denotes the number of bits of a CB r, and C represents the total number of CBs (s1310).

Channel coding is performed on $c_{r0}, c_{r1}, c_{r2}, c_{r3}, \ldots, c_{r(K_r-1)}$ input to a channel coding unit to generate $d_{r0}^{(i)}, d_{r1}^{(i)}, d_{r2}^{(i)}, d_{r3}^{(i)}, \ldots, d_{r(D_r-1)}^{(i)}$. Here, i (i=0, 1, 2) denotes an index of a coded data stream, $D_r$ denotes the number of bits of an i-th coded data stream for the code block r (that is, $D_r = K_r + 4$), r represents CB number, and C represents the total number of CBs. In the embodiments of the present invention, each CB can be channel-coded using turbo-coding (S1320).

Upon completion of the channel coding, rate matching is performed to generate $e_{r0}, e_{r1}, e_{r2}, e_{r3}, \ldots, er_{(E_r-1)}$. Here, denotes the number of rate-matched bits of an r-th CB (r=0, 1, ..., C−1), and C denotes the total number of CBs (S1330).

After rate matching, CB concatenation is performed to result in bits $f_0, f_1, f_2, f_3, \ldots, f_{G-1}$. Here, G represents the total number of coded bits. When the control information is multiplexed with the UL-SCH data and transmitted, bits used to transmit the control information are not included in G. Bits $f_0, f_1, f_2, f_3, \ldots, f_{G-1}$ correspond to a UL-SCH codeword (S1340).

CQI and/or PMI, RI and HARQ-ACK of the UCI are independently channel-coded (s1350, S1360 and S1370). Channel coding of UCI is performed on the basis of the number of coded symbols for UCI. For example, the number of coded symbols can be used for rate matching of coded control information. The number of coded symbols corresponds to the number of modulation symbols and the number of REs.

The CQI is channel-coded using an input bit sequence $o_0, o_1, o_2, o_3, \ldots, o_{O-1}$ (S1350) to result in an output bit sequence $q_0, q_1, q_2, q_3, \ldots, q_{Q_{CQI}-1}$. A channel coding scheme for the CQI depends on the number of bits of the CQI. When the CQI has 11 bits or more, an 8-bit CRC is added to the CQI. In the output bit sequence, $Q_{CQI}$ denotes the total number of coded bits for the CQI. The coded CQI can be rate-matched in order to match the length of the bit sequence to $Q_{CQI}$. $Q_{CQI} = Q'_{CQI} \times Q_m$ where $Q'_{CQI}$ is the number of coded symbols for the CQI and $Q_m$ is the modulation order. $Q_m$ of the CQI is equal to that of the UL-SCH data.

The RI is channel-coded using an input bit sequence $[o_0^{RI}]$ or $[o_0^{RI} o_1^{RI}]$ (S1360). Here, $[o_0^{RI}]$ and $[o_0^{RI} o_1^{RI}]$ denote 1-bit RI and 2-bit RI, respectively.

In the case of 1-bit RI, repetition coding is used. For the 2-bit RI, (3,2) simplex code is used for coding and encoded data can be cyclically repeated. RI having 3 to 11 bits is coded using (32,0) RM code used in an uplink shared channel. RI having 12 bits or more is divided into two groups using a double RM structure and each group is coded using the (32,0) RM code. An output bit sequence $q_0^{RI}, q_1^{RI}, q_2^{RI}, \ldots, q_{Q_{RI}-1}^{RI}$ is obtained by concatenating coded RI blocks. Here, $Q_{RI}$ represents the total number of coded bits for the RI. The coded RI block finally concatenated may be part of the RI in order to match the length of the coded RI to $Q_{RI}$ (that is, rate matching). $Q_{RI} = Q'_{RI} \times Q_m$ where $Q'_{RI}$ is the number of coded symbols for the RI and $Q_m$ is the modulation order. $Q_m$ of the RI is equal to that of the UL-SCH data.

HARQ-ACK is channel-coded using an input bit sequence $[o_0^{ACK}]$, $[o_0^{ACK} o_1^{ACK}]$ or $[o_0^{ACK} o_1^{ACK} \ldots o_{O^{ACK}-1}^{ACK}]$ (S1370). $[o_0^{ACK}]$, $[o_0^{ACK} o_1^{ACK}]$ respectively mean 1-bit HARQ-ACK and 2-bit HARQ-ACK. $[o_0^{ACK} o_1^{ACK} \ldots o_{O^{ACK}-1}^{ACK}]$ represents HARQ-ACK composed of information of more than two bits (that is, $O^{ACK} > 2$).

At this time, ACK is coded into 1 and NACK is coded into 0. 1-bit HARQ-ACK is coded using repetition coding. 2-bit HARQ-ACK is coded using a (3,2) simplex code and encoded data can be cyclically repeated. HARQ-ACK having 3 to 11 bits is coded using a (32,0) RM code used in an uplink shared channel. HARQ-ACK of 12 bits or more is divided into two groups using a double RM structure and each group is coded using a (32,0) RM code. $Q_{ACK}$ denotes the total number of coded bits for the HARQ-ACK and a bit sequence $q_0^{ACK}, q_1^{ACK}, q_2^{ACK}, \ldots q_{Q_{ACK}-1}^{ACK}$ is obtained by concatenating coded HARQ-ACK blocks. The coded HARQ-ACK block finally concatenated may be part of the HARQ-ACK in order to match the length of the bit sequence to $Q^{ACK}$ (that is, rate matching). $Q_{ACK} = Q'_{ACK} \times Q_m$ where $Q'_{ACK}$ is the number of coded symbols for the HARQ-ACK and $Q_m$ is the modulation order. $Q_m$ of the HARQ-ACK is equal to that of the UL-SCH data.

Coded UL-SCH bits $f_0, f_1, f_2, f_3, \ldots, f_{G-1}$ and coded CQI/PMI bits $q_0, q_1, q_2, q_3, \ldots, q_{Q_{CQI}-1}$ are input to a data/control multiplexing block (S1380). The data/control multiplexing block outputs $g_0, g_1, g_2, g_3, \ldots, g_{H'-1}$. Here, $g_i$ is a column vector having a length of $Q_m$ (i=0, ... H'–1). $g_i$ (i=0, ..., H'–1) represents a column vector having a length of ($Q_m \cdot N_L$). H=(G+$N_L \cdot Q_{CQI}$) and H'=H/($N_L \cdot Q_m$). $N_L$ denotes the number of layers to which the UL-SCH TB is mapped and H denotes the total number of coded bits allocated to the $N_L$ transport layers to which the UL-SCH TB is mapped for the UL-SCH data and CQI/PMI. That is, H is the total number of coded bits allocated for the UL-SCH data and CQI/PMI.

A channel interleaver channel-interleaves coded bits input thereto. The input of the channel interleaver includes the output of the data/control multiplexing block, $g_0, g_1, g_2, \ldots, g_{H'-1}$, the coded $q_0^{RI}, q_1^{RI}, q_2^{RI}, \ldots, q_{Q_{RI}-1}^{RI}$, and the coded HARQ-ACK $q_0^{ACK}, q_1^{ACK}, q_2^{ACK}, \ldots q_{Q'_{ACK}-1}^{ACK}$ (S1390).

In step S1390, $g_i$ (i=0, ..., H'–1) is the column vector having a length of $Q_m$ for the CQI/PMI, $q_i^{ACK}$ (i=0, ..., $Q'_{ACK}$–1) is a column vector of a length of $Q_m$ for the ACK/NACK, and $q_i^{RI}$($Q'_{RI}$=$Q_{RI}/Q_m$) is a column vector having a length of $Q_m$ for the RI.

The channel interleaver multiplexes the control information and/or the UL-SCH data for PUSCH transmission. Specifically, the channel interleaver maps the control information and the UL-SCH data to a channel interleaver matrix corresponding to the PUSCH resource.

Upon completion of channel interleaving, a bit sequence $h_0, h_1, h_2, \ldots, h_{H+Q_m-1}$, is output column by column from the channel interleaver matrix. The output bit sequence $h_0, h_1, h_2, \ldots, h_{H+Q_m-1}$ is mapped onto a resource grid.

Figure 14:
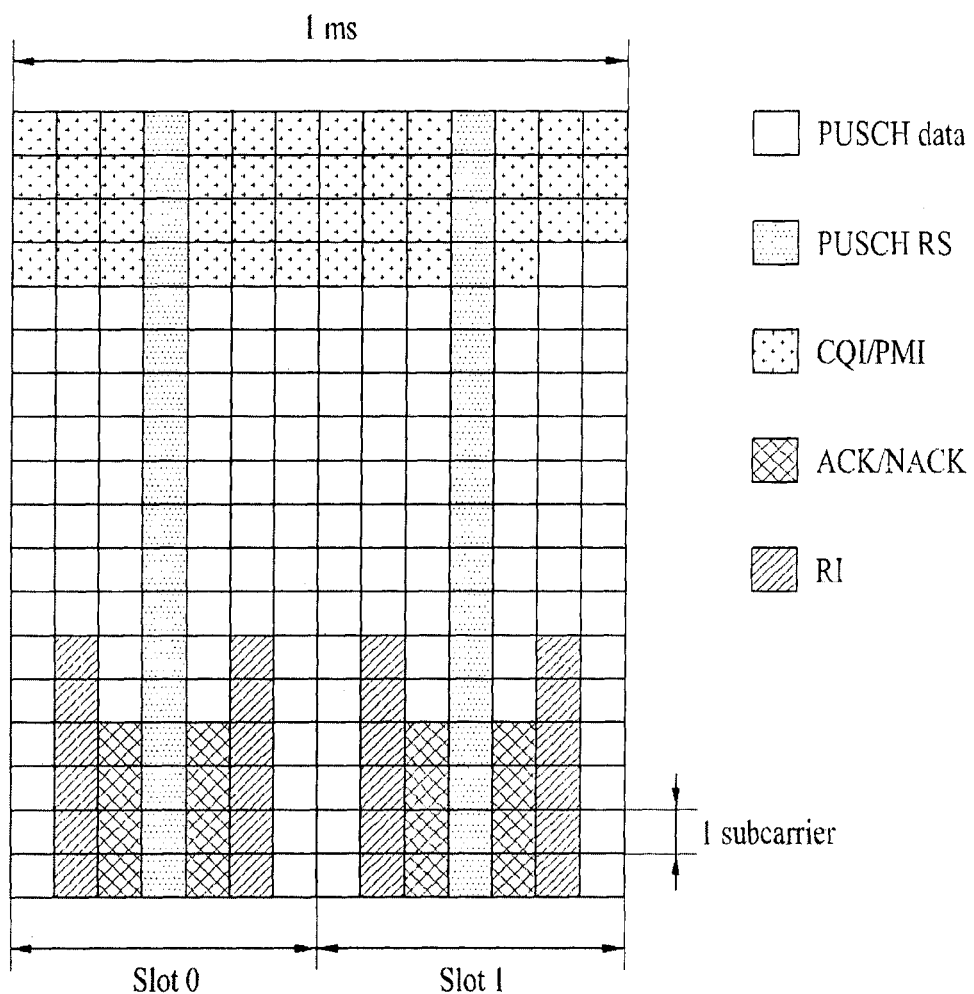
FIG. 14 illustrates an exemplary method for multiplexing UCI and UL-SCH data on a PUSCH.

FIG. 14 illustrates an exemplary method of multiplexing UCI and UL-SCH data on a PUSCH.

When a UE attempts to transmit control information in a subframe assigned for PUSCH transmission, the UE multiplexes the UCI and UL-SCH data prior to DFT-spreading. The UCI includes at least one of CQI/PMI, HARQ-ACK/NACK and RI.

The numbers of REs used to transmit the CQI/PMI, HARQ-ACK/NACK and RI are based on a modulation and coding scheme (MCS) and offset values offset $\Delta_{offset}^{CQI}$, $\Delta_{offset}^{HARQ-ACK}$, and $\Delta_{offset}^{RI}$ allocated for PUSCH transmission. The offset values permit different coding rates according to control information and are semi-statically set by a higher layer (e.g. RRC layer) signal. The UL-SCH data and control information are not mapped to the same RE. The control information is mapped such that it is present in two slots of a subframe, as shown in FIG. 14. A BS can easily demultiplex the control information and data packet since it can be aware of transmission of the control information through the PUSCH in advance.

Referring to FIG. 14, CQI and/or PMI (CQI/PMI) resources are located at the beginning of a UL-SCH data resource, sequentially mapped to all SC-FDMA symbols on one subcarrier and then mapped to the next subcarrier. The CQI/PMI are mapped from the left to the right in subcarriers, that is, in a direction in which the SC-FDMA symbol index increases. PUSCH data (UL-SCH data) is rate-matched in consideration of the quantity of the CQI/PMI resources (i.e., the number of coded symbols). The CQI/PMI uses the same modulation order as that of the UL-SCH data.

For example, when the CQI/PMI has a small information size (payload size) (e.g. less than 11 bits), (32, k) block code is used for the CQI/PMI, similarly to PUCCH data transmission, and coded data can be cyclically repeated. For CQI/PMI having a small information size, a CRC is not used.

If the CQI/PMI has a large information size (e.g. greater than 11 bits), an 8-bit CRC is added to the CQI/PMI and channel coding and rate matching are performed using a tail-biting convolutional code. The ACK/NACK is inserted into part of SC-FDMA resources to which the UL-SCH data is mapped through puncturing. The ACK/NACK is located next to an RS and filled in corresponding SC-FDMA symbols from the bottom to the top, that is, in a direction in which the subcarrier index increases.

In the case of normal CP, SC-FDMA symbols for ACK/NACK correspond to SC-FDMA symbols #2 and #4 in each slot, as shown in FIG. 14. The coded RI is located next to symbols (i.e., symbols #1 and #5) for the ACK/NACK irrespective of whether the ACK/NACK is practically transmitted in the subframe. Here, the ACK/NACK, RI and CQI/PMI are independently coded.

Figure 15:
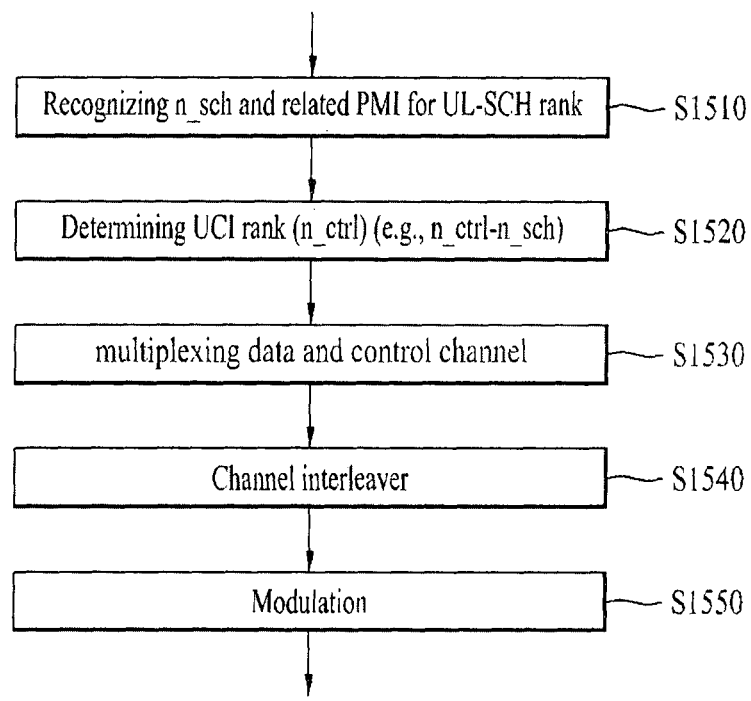
FIG. 15 is a flowchart illustrating a procedure of multiplexing control information and UL-SCH data in a multiple input multiple output (MIMO) system.

FIG. 15 is a flowchart illustrating a procedure of multiplexing control information and UL-SCH data in a MIMO system.

Referring to FIG. 15, a UE identifies a rank n_sch for a UL-SCH (data part) and PMI related to the rank from scheduling information for PUSCH transmission (S1510). The UE determines a rank n_ctrl for UCI (S1520). The rank of the UCI can be set such that it is equal to that of the UL-SCH (n_ctrl=n_sch). However, the present invention is not limited thereto. The data and control channel are multiplexed (S1530). A channel interleaver performs time-first-mapping and punctures regions around a DM-RS to map ACK/NACK/RI (S1540). Then, the data and control channel are modulated according to an MCS table (S1540). The modulation scheme may include QPSK, 16QAM, and 64QAM, for example. The order/position of the modulation may be changed (e.g. before multiplexing of the data and control channel).

Figure 16:
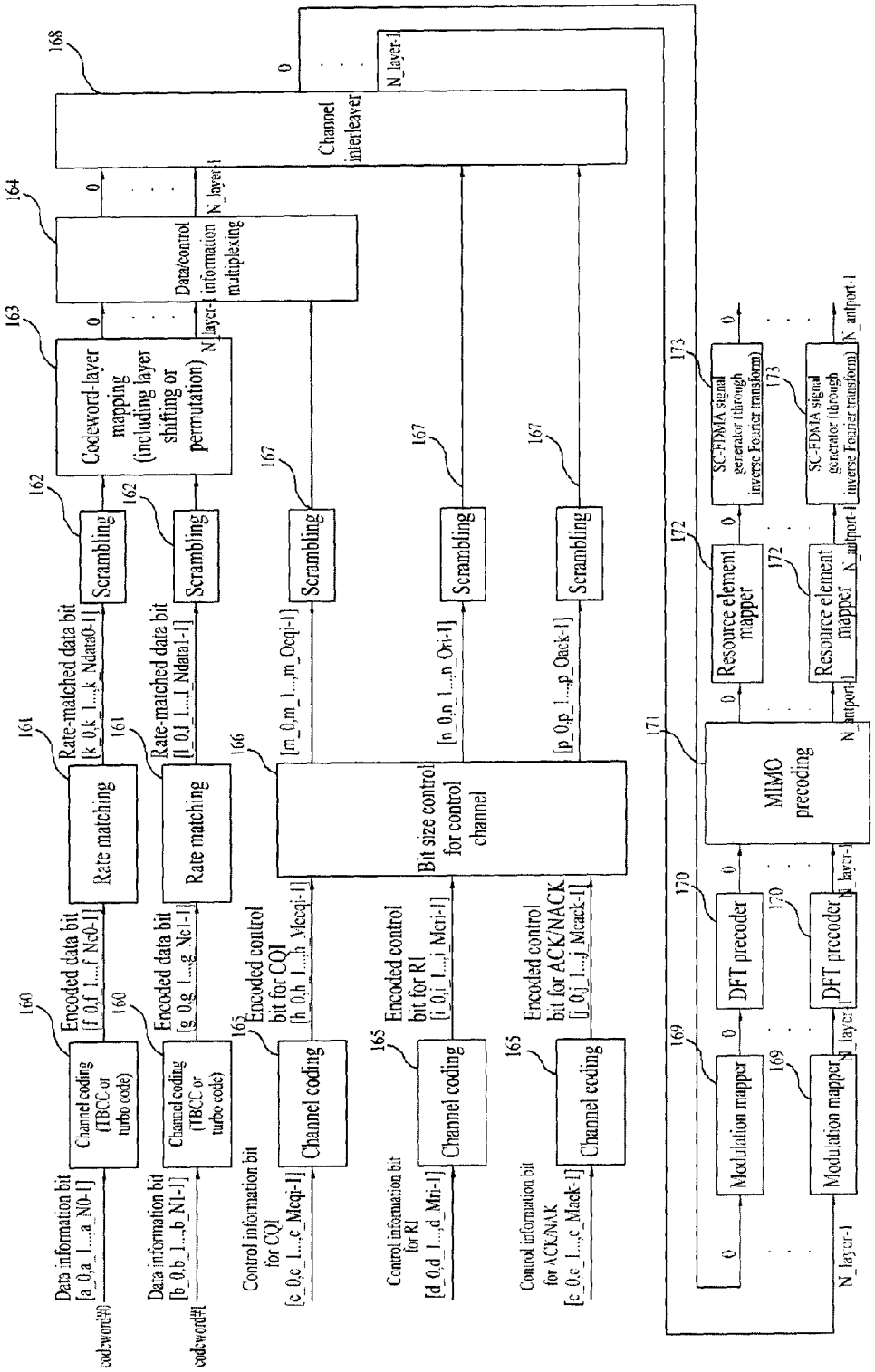
FIG. 16 illustrates an exemplary method for multiplexing a plurality of UL-SCH TBs and UCI by a UE according to an embodiment of the present invention.

FIG. 16 illustrates an exemplary method for multiplexing and transmitting a plurality of UL-SCH TBs and UCI by a UE according to an embodiment of the present invention.

While FIG. 16 illustrates a case in which two codewords are transmitted for convenience, the method shown in FIG. 16 can be applied to transmission of one or three or more codewords. A codeword and a TB correspond to each other and are used interchangeably in the specification. Since a basic procedure of the method is identical/similar to the procedure described above with reference to FIGS. 13 and 14, a description will be given of part related to MIMO.

Assuming that two codewords are transmitted in FIG. 16, channel coding is performed on each codeword (160). Rate matching is carried out according to a given MCS level and resource size (161). Encoded bits may be cell-specifically, UE-specifically or codeword-specifically scrambled (162). Then, codeword-to-layer mapping is performed (163). The codeword-to-layer mapping may include layer shifting or permutation.

The control information such as CQI, RI and ACK/NACK is channel-coded in a channel coding block (165) according to predetermined specifications. Here, the CQI, RI and ACK/NACK can be coded using the same channel code for all the codewords or coded using different channels codes specific to the codewords.

The number of the encoded bits may be changed by a bit size controller 166. The bit size controller 166 may be unified with the channel coding block 165. A signal output from the bit size controller 166 is scrambled (167). The scrambling can be performed cell-specifically, layer-specifically, codeword-specifically or UE-specifically.

The bit size controller 166 can operate as follows.

(1) The bit size controller recognizes a rank n_rank_pusch of data for a PUSCH.

(2) A rank n_rank_control of a control channel is set to correspond to the rank of the data (i.e., n_rank_control=n_rank_pusch) and the number of bits (n_bit_ctrl) for the control channel is extended by multiplying it by the rank of the control channel.

This is performed by simply copying the control channel to repeat the control channel. At this time, the control channel may be an information level prior to channel coding or an encoded bit level after channel coding. In the case of a control channel [a0, a1, a2, a3] having n_bit_ctrl=4 and a data rank of n_rank_pusch=2, for example, the extended number of bits (n_ext_ctrl) of the control channel can be 8 bits [a0, a1, a2, a3, a0, a1, a2, a3].

Alternatively, a circular buffer scheme may be applied such that the extended number of bits (n_ext_ctrl) becomes 8 bits.

When the bit size controller 166 and channel encoder 165 are unified, encoded bits can be generated using channel coding and rate matching defined in the existing system (e.g. LTE Rel-8).

In addition to the bit size controller 166, bit level interleaving may be performed to further randomize layers. Equivalently, interleaving may be carried out at the modulation symbol level.

CQI/PMI channels and control information (or control data) with respect to the two codewords can be multiplexed by a data/control multiplexer 164. Then, a channel interleaver 168 maps the CQI/PMI according to the time-first-mapping scheme such that ACK/NACK information is mapped to REs around an uplink DM-RS in each of two slots in one subframe.

A modulation mapper 169 modulates each layer and a DFT precoder 170 performs DFT precoding. A MIMO precoder 171 carries out MIMO precoding and a resource element mapper 172 sequentially executes RE mapping. Then, an SC-FDMA signal generator 173 generates an SC-FDMA signal and transmits the generated signal through an antenna port.

The positions of the aforementioned functional blocks are not limited to locations shown in FIG. 16 and can be changed. For example, the scrambling blocks 162 and 167 can follow the channel interleaving block 168 and the codeword-to-layer mapping block 163 can follow the channel interleaving block 168 or the modulation mapper 169.

2. Multi-Carrier Aggregation Environment

Communication environments considered in the embodiments of the present invention include multi-carrier environments. A multi-carrier system or a carrier aggregation system used in the present invention means a system that uses aggregation of one or more component carriers (CCs) having bandwidths narrower than a target bandwidth to support broadband.

Multi-carrier means carrier aggregation (carrier concatenation in the present invention. The carrier aggregation includes concatenation of non-contiguous carriers as well as concatenation of contiguous carriers. Furthermore, carrier concatenation can be used interchangeably with the terms "carrier aggregation", "bandwidth concatenation", etc.

Multi-carrier (i.e. carrier aggregation) composed of two or more CCs aims to support up to 100 MHz in the LTE-A system. When one or more carriers having bandwidths narrower than a target bandwidth are aggregated, the bandwidths of the aggregated carriers can be limited to the bandwidth used in the existing system in order to maintain backwards compatibility with the existing IMT system.

For example, the 3GPP LTE system supports {1, 4, 3, 5, 10, 15, 20}MHz and the 3GPP LTE-Advanced system (LTE-A) supports bandwidths wider than 20 MHz using the bandwidths supported by LTE. The multi-carrier system used in the present invention can define a new bandwidth irrespective of the bandwidths used in the existing systems to support carrier aggregation.

The LTE-A system uses the concept of the cell to manage radio resources. The cell is defined as a combination of downlink resources and uplink resources. The uplink resources are not an essential element, and thus the cell may be composed of downlink resources only. If multi-carrier (i.e. carrier aggregation) is supported, linkage between a carrier frequency (or DL CC) of the downlink resource and a carrier frequency (or UL CC) of the uplink resource can be indicated by system information (SIB).

Cells used in the LTE-A system include a primary cell (P cell) and a secondary cell (S cell). The P cell may mean a cell operating at a primary frequency (e.g., primary CC (PCC)) and the S cell may mean a cell operating at a secondary frequency (e.g., secondary CC (SCC)). For a specific UE, only one P cell and one or more S cells can be allocated.

The P cell is used for a UE to perform an initial connection establishment procedure or a connection re-establishment procedure. The P cell may mean a cell designated during a handover procedure. The S cell can be configured after RRC connection is established and used to provide additional radio resources.

The P cell and the S cell can be used as serving cells. For a UE for which carrier aggregation is not set although the UE is in an RRC-connected state or a UE which does not support carrier aggregation, only one serving cell configured with only the P cell is present. In the case of a UE in an RRC-connected state, for which carrier aggregation is set, one or more serving cells can be present and the serving cells include the P cell and one or more S cells.

Upon beginning an initial security activation procedure, an E-UTRAN can establish a network including one or more S cells in addition to the P cell initially configured in a connection establishment procedure. In a multi-carrier environment, the P cell and S cell can operate as component carriers. That is, carrier aggregation can be understood as a combination of the P cell and one or more S cells. In the following embodiments, the PCC corresponds to the P cell and the SCC corresponds to the S cell.

3. System Model

In this section, we describe a system model for downlink DAS with transmit beamforming in single-cell environments. We consider that the system has N' DA ports with 'M' antennas and 'K' users (i.e., user eqtiipment (UE)) with a single antenna. Also, it is assumed that all users are uniformly distributed within a cell with the radius of R. The locations of DA ports are determined by maximizing a lower bound of the expected signal-to-noise ratio (SNR).

Figure 17:
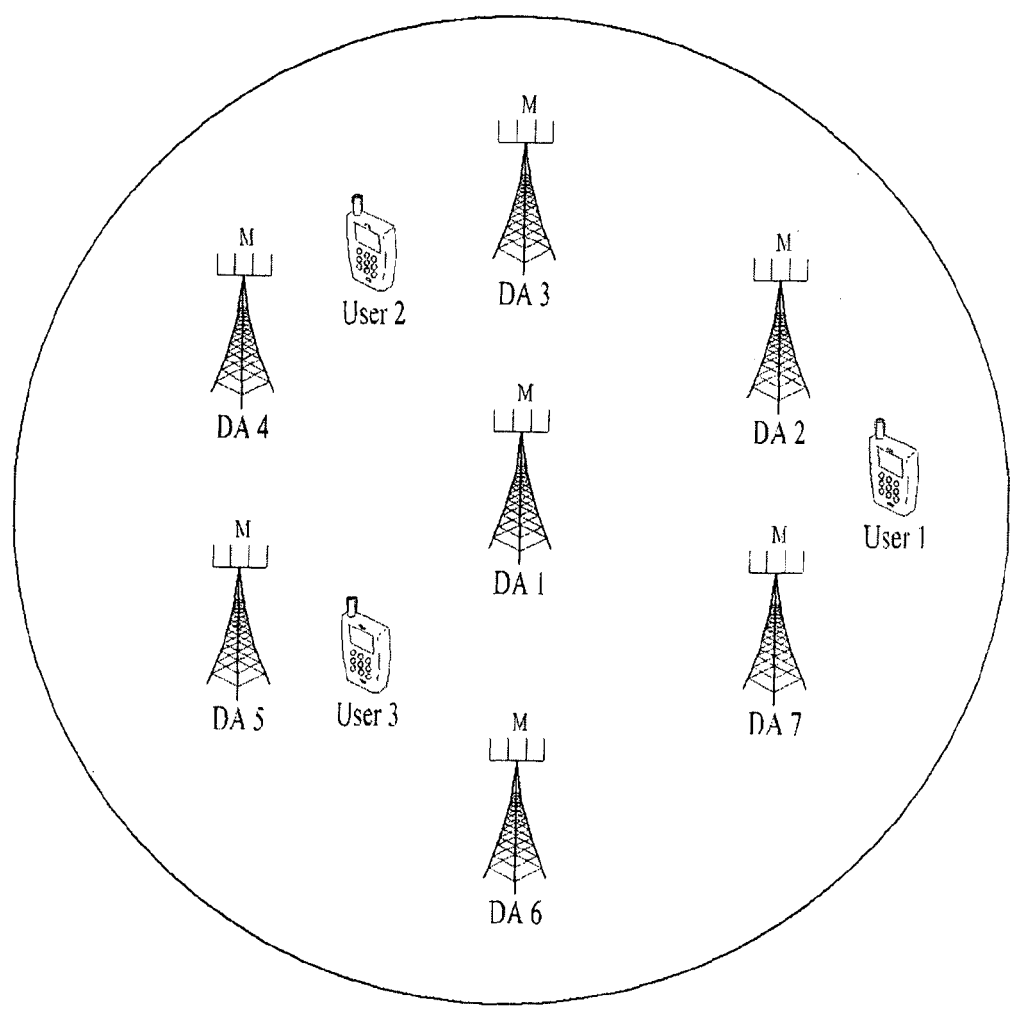
FIG. 17 illustrates a system model for single cell DAS which is applicable to the embodiments of the present invention.
Figure 18:
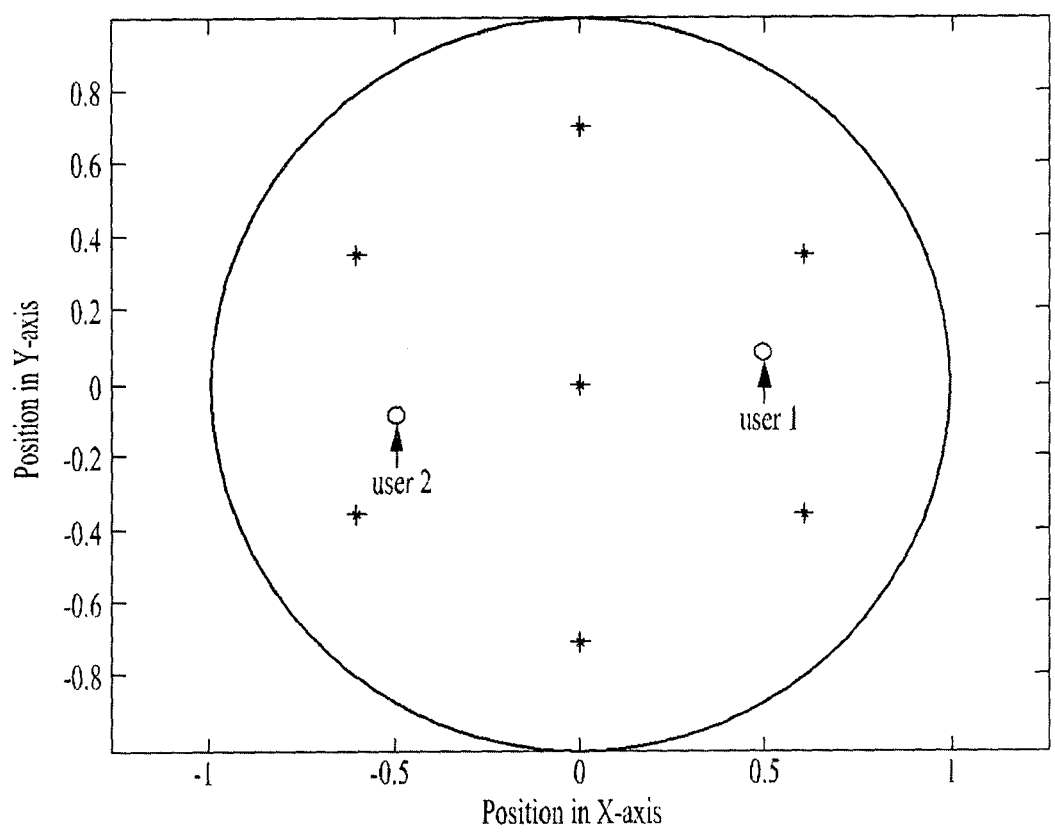
FIG. 18 illustrates one deployment of DA ports and UEs, which is applicable to the embodiments of the present invention.

FIG. 17 illustrates system model for single cell DAS which can be apdatped to the present invention.

Referring to FIG. 17, FIG. 17 shows the single-cell DAS with N=7 and K=3. Since DA ports are geographically separated in DAS, we adopt the channel model which encompasses not only small scale fadings (i.e. Rayleigh fadings) but also large scale fadings (i.e. path loss). In this present application, we assume per-DA port power constraint P. In this case, the DA ports may be a part of a base station (or, e-Node B) or the base station itself. For example, the multiple antenna ports of the base station comprise the DA ports.

The DA port nearest to each user is selected and the chosen DA port transmits the signal to the corresponding user. In case where one DA port is selected by multiple users, only the nearest user from the DA port is supported, and the remaining users who are not selected choose the next nearest DA port. Let us denote n(i) as the selected DA port index for the i-th user. Then, we represent $g_{n(i),k} = d_{n(i),k}^{-\alpha/2} h_{n(i),k}$ as the channel column vector of length M from the n(i)-th DA port to the k-th user, where $d_{n(i),k}$ stands for the distance between the n(i)-th DA port and the k-th user, $\alpha$ indicates the path loss exponent and $h_{n(i),k}$ equals the channel column vector for small scale fadings. The elements of $h_{n(i),k}$ are independent and identically distributed complex Gaussian random variables with zero mean and unit variance.

The received signal for the k-th user can be expressed as following Equation 1.

$$y_k = \sqrt{P} \sum_{i=1}^{K} g_{n(i),k}^{H} x_{n(i)} + n_k \quad \text{[Equation 1]}$$

At Equation 1, where $x_{n(i)}$ represents the transmitted signal column vector of length M from the n(i)-th DA port and $n_k$ indicates the additive complex Gaussian noise variable with zero mean and variance $\sigma^{-2}$. In addition, P represent a power constraint of the DA port. Here, $x_{n(i)}$ is precoded as $x_{n(i)} = w_{n(i)} s_{n(i)}$, where $w_{n(i)}$ is defined by the i-th user beamforming column vector of length M for the n(i)-th DA port with unit norm ($\|w_{n(i)}\|=1$), $s_{n(i)}$ denotes the desired signal of the i-th user transmitted from the n(i)-th DA port with $\epsilon[|s_{n(i)}|^2]=1$.

Then the sum rate can be written as following Equation 2.

$$C = \sum_{k=1}^{K} \log_2 \left( 1 + \frac{P|g_{n(k),k}^{H} w_{n(k)}|^2}{\sigma_n^2 + P \sum_{i=1, i \neq k}^{K} |g_{n(i),k}^{H} w_{n(i)}|^2} \right) \quad \text{[Equation 2]}$$

In this case, $$\frac{P|g_{n(k),k}^{H} w_{n(k)}|^2}{\sigma_n^2 + P \sum_{i=1, i \neq k}^{K} |g_{n(i),k}^{H} w_{n(i)}|^2}$$

is the SINR for the k-th user. Thus, in order to maximize the sum rate, we should optimize the SINR. However, it is highly complicated to obtain the beamforming vector which maximizes the SINR due to its coupled nature. Thus, in this present invention, the beamforming vector $w_{n(k)}$ for the k-th user is determined by maximizing signal-to-leakage plus noise ratio (SLNR) to simplify the derivation. Although the maximization of the SLNR is not optimum in terms of the sum rate, it offers good performance for multi-cell systems and does not need an iterative method to compute the beamforming vector. The SLNR for the k-th user is defined as following Equation 3.

$$SLNR_k = \frac{P|g_{n(k),k}^{H} w_{n(k)}|^2}{\sigma_n^2 + P \sum_{i=1, i \neq k}^{K} |g_{n(k),i}^{H} w_{n(k)}|^2} \quad \text{[Equation 3]}$$

Then, the k-th user beamforming vector which maximizes SLNRk can be given by following Equation 4.

$$w_{n(k)} = \max \text{ eigenvector} \quad \text{[Equation 4]}$$

$$\left( \left( \sigma_n^2 I + P \sum_{i=1, i \neq k}^{K} d_{n(k),i}^{-\alpha} \hat{h}_{n(k),i} \hat{h}_{n(k),i}^{H} \right)^{-1} P d_{n(k),k}^{-\alpha} \hat{h}_{n(k),k} \hat{h}_{n(k),k}^{H} \right)$$

4. Distributed Antenna System with Limited Feedback

In this present invention, we assume that every users and DA ports know distances for both the serving channel link and the interfering links. Also, we consider that each user has perfect knowledge of small scale fadings, while each DA port knows channel quality information (i.e., channel magnitude information) of small scale fadings. In order to compute the beamforming vector, DA ports should have channel direction (CDI) as well. Thus, in the limited feedback systems, each user quantizes the direction of the linked channels and feeds back CDI to the DA ports based on a codebook. Here, we define the CDI between the k-th user and the n(i)-th DA port as $\tilde{h}_{n(i),k} = h_{n(i),k}/\|h_{n(i),k}\|$. Also, we denote $B_k^t = \sum_{i=1}^{K} B_{k,n(i)}$ as the total number of feedback bits for the k-th user where $B_{k,n(i)}$ indicates the number of feedback bits for the channel between the k-th user and the n(i)-th DA port.

Then, using the codebook $C_{k,n(i)} = \{c_{k,n(i),1}, c_{k,n(i),2}, \ldots c_{k,n(i),2^{B_{k,n(i)}}}\}$ which consists of unit norm column vectors of length M, the k-th user sends the codeword index to the n(i)-th DA port, and thus the n(i)-th DA port acquires the CDI of the linked channel. In this present invention, in order to design a codebook, we employ RVQ which chooses the codebook vectors independently from an isotropic distribution on the M dimensional unit hypersphere. Also, defining $\hat{h}_{n(i),k}$ as the quantized channel of small scale fading from the n(i)-th DA port to the k-th user, $\hat{h}_{n(i),k}$ can be selected as $$\hat{h}_{n(i),k} = \arg \max_{c \in C_{k,n(i)}} |\tilde{h}_{n(i),k}^{H} c|^2.$$

In this present invention, we define $\hat{w}_{n(k)}$ as the beamforming vector for k-th user. Then, we determine a signal-to-leakage plus noise ratio (SLNR) and $\hat{w}^*_{n(k)}$ by substituting $\hat{h}$ instead of h in Equations 3 and 4, respectively. Also, the average sum rate can be represented as following Equation 5.

$$\varepsilon[C] = \varepsilon \left[ \sum_{k=1}^{K} \log_2 \left( 1 + \frac{P d_{n(k),k}^{-\alpha} |h_{n(k),k}^{H} \hat{w}_{n(k)}|^2}{\sigma_n^2 + \sum_{i \neq k}^{K} P d_{n(i),k}^{-\alpha} |h_{n(i),k}^{H} \hat{w}_{n(i)}|^2} \right) \right] \quad \text{[Equation 5]}$$

At Equation 5, $$\frac{P d_{n(k),k}^{-\alpha} |h_{n(k),k}^{H} \hat{w}_{n(k)}|^2}{\sigma_n^2 + \sum_{i \neq k}^{K} P d_{n(i),k}^{-\alpha} |h_{n(i),k}^{H} \hat{w}_{n(i)}|^2}$$

represents the SINR for the k-th user SINR.

5. Feedback Bit Allocation Algorithm

For the fixed number of total feedback bits $B_k^t$ for the k-th user, the number of allocated bit for the linked channel should be optimally allocated to maximize the average sum rate of Equation 5, since the number of feedback bits affects both the desired signal and the interference. However, it is complicated to obtain the optimal feedback bits in terms of the maximum average sum rate. Thus, in this section, we propose a feedback bit allocation algorithm which maximizes a lower bound of the expected SINR.

5.1 Problem Formulation

Since log e (1+X) is concave for X>0, E [log$_2$(1+X)]·log$_2$ (1+E[X]). Thus, the sum rate is bounded by $$\varepsilon[C] \leq \sum_{k=1}^{K} \log_2(1 + \varepsilon[SINR_k]).$$

Here, the expected $SINR_k$ can be written as following Equation 6 Since the transmit power and the distance between the k-th user and DA ports are fixed values, and the desired term and the interference term are independent.

$$\varepsilon[SINR_k] = \varepsilon\left[\frac{Pd_{n(k),k}^{-\alpha}|h_{n(k),k}^H \hat{w}_{n(k)}|^2}{\sigma_n^2 + \sum_{i \neq k}^{K} Pd_{n(i),k}^{-\alpha}|h_{n(i),k}^H \hat{w}_{n(i)}|^2}\right] \quad \text{[Equation 6]}$$

$$= Pd_{n(k),k}^{-\alpha}\varepsilon[|h_{n(k),k}^H \hat{w}_{n(k)}|^2]\varepsilon\left[\frac{1}{\sigma_n^2 + \sum_{i \neq k}^{K} Pd_{n(i),k}^{-\alpha}|h_{n(i),k}^H \hat{w}_{n(i)}|^2}\right]$$

It is still difficult to derive the optimal feedback bits which maximize Equation 6. Thus, we obtain a lower bound of $\varepsilon[SINR_k]$ by applying the Jensen's inequality. Since $$\frac{1}{1+X}$$

for X≥0 is convex, $\varepsilon[SINR_k]$ is lower-bounded by Equation 7.

$$\varepsilon[SINR_k] \geq \frac{Pd_{n(k),k}^{-\alpha}\varepsilon[|h_{n(k),k}^H \hat{w}_{n(k)}|^2]}{\sigma_n^2 + \sum_{i \neq k}^{K} Pd_{n(i),k}^{-\alpha}\varepsilon[|h_{n(i),k}^H \hat{w}_{n(i)}|^2]} \quad \text{[Equation 7]}$$

Next, we present lemmas to derive the bound of $\varepsilon[|h_{n(k),k}^H \hat{w}_{n(k)}|^2]$ and $\varepsilon[|h_{n(i),k}^H \hat{w}_{n(i)}|^2]$.

5.1.1 Lemma 1

The desired term for the k=th user is bounded as $$\varepsilon[|h_{n(k),k}^H \hat{w}_{n(k)}|^2] > M\left(1 - 2^{-\frac{B_{k,n(k)}}{M-1}}\right).$$

This is because, the channel magnitude and the channel direction are independent, $\varepsilon[\|h_{n(k),k}\|^2]=M$, and $\varepsilon[|h_{n(k),k}^H \hat{w}_{n(k)}|^2]$ is represented as $\varepsilon[|h_{n(k),k}^H \hat{w}_{n(k)}|^2] = M\varepsilon[|\tilde{h}_{n(k),k}^H \hat{w}_{n(k)}|^2]$.

Also, $\varepsilon[|\tilde{h}_{n(k),k}^H \hat{w}_{n(k)}|^2]$ is bounded by inequity $\varepsilon[|\tilde{h}_{n(k),k}^H \hat{w}_{n(k)}|^2] \geq \varepsilon[|\tilde{h}_{n(k),k}^H \hat{h}_{n(k),k}|^2|\hat{h}_{n(k),k}^H \hat{w}_{n(k)}|^2]$.

In addition, since $0<|\hat{h}_{n(k),k}^H \hat{w}_{n(k)}|^2 \leq 1$, $\varepsilon[|\tilde{h}_{n(k),k}^H \hat{w}_{n(k)}|^2]$ is lower bounded by $\varepsilon[|\tilde{h}_{n(k),k}^H \hat{w}_{n(k)}|^2] \geq \varepsilon[|\tilde{h}_{n(k),k}^H \hat{h}_{n(k),k}|^2]$.

Defining $v \triangleq |\tilde{h}_{n(k),k}^H \hat{h}_{n(k),k}|^2$, the probability density function of v is given by following Equation 8.

$$f_v(v) = \sum_{i=0}^{2^{B_{k,n(k)}}} \sum_{j=1}^{i(M-1)} \binom{2^{B_{k,n(k)}}}{i}\binom{i(M-1)}{j}(-1)^{i+j} jv^{j-1} \quad \text{[Equation 8]}$$

Therefore, $\varepsilon[|\tilde{h}_{n(k),k}^H \hat{h}_{n(k),k}|^2]$ is written as $$\varepsilon[|\tilde{h}_{n(k),k}^H \hat{h}_{n(k),k}|^2] = \int_0^1 v f_v(v) dv$$

$$= 1 - 2^{B_{k,n(k)}}\beta\left(2^{B_{k,n(k)}}, \frac{M}{M-1}\right),$$

where $\beta(\cdot, \cdot)$ denotes the beta function defined in terms of the gamma function as $$\beta(x, y) = \frac{\Gamma(x)\Gamma(y)}{\Gamma(x+y)}.$$

Finally, since we have $$2^{B_{k,n(k)}}\beta\left(2^{B_{k,n(k)}}, \frac{M}{M-1}\right) < 2^{-\frac{B_{k,n(k)}}{M-1}},$$

the desired term for the k-th user is lower-bounded as $$\varepsilon[|h_{n(k),k}^H \hat{w}_{n(k)}|^2] > M\left(1 - 2^{-\frac{B_{k,n(k)}}{M-1}}\right).$$

5.1.2 Lemma 2

The interference term for the k-th user from the n(i)-th DA port (i !=k) is upper-bounded as $$\varepsilon[|h_{n(i),k}^H \hat{w}_{n(i)}|^2] < M \cdot 2^{-\frac{B_{k,n(i)}}{M-1}}.$$

This is because, similar to the desired term case (see, section 5.1.1), $\varepsilon[|h_{n(i),k}^H \hat{w}_{n(i)}|^2]$ is expressed as $\varepsilon[|h_{n(i),k}^H \hat{w}_{n(i)}|^2] = M\varepsilon[|\tilde{h}_{n(i),k}^H \hat{w}_{n(i)}|^2]$ Also, $\varepsilon[|\tilde{h}_{n(i),k}^H \hat{w}_{n(i)}|^2]$ is bounded by $$\varepsilon[|\tilde{h}_{n(i),k}^H \hat{w}_{n(i)}|^2] \leq \varepsilon[1 - |\hat{h}_{n(i),k}^H \hat{h}_{n(i),k}|^2]$$

$$= 2^{B_{k,n(i)}}\beta\left(2^{B_{k,n(i)}}, \frac{M}{M-1}\right).$$

Finally, since $$2^{B_{k,n(i)}}\beta\left(2^{B_{k,n(i)}}, \frac{M}{M-1}\right) < 2^{-\frac{B_{k,n(i)}}{M-1}},$$

the interference term for the k-th user from the n(i)-th DA port is upper-bounded as $$\varepsilon\left[|h_{n(i),k}^H \hat{w}_{n(i)}|^2\right] < M \cdot 2^{-\frac{B_{k,n(i)}}{M-1}}.$$

By using the results on lemmas 1 and 2, $\varepsilon[SINR_k]$ can be bounded by $$\varepsilon[SINR_k] > \frac{PMd_{n(k),k}^{-\alpha}\left(1 - 2^{-\frac{B_{k,n(k)}}{M-1}}\right)}{\sigma_n^2 + \sum_{\substack{i=k \\ i \neq k}}^{K} PMd_{n(i),k}^{-\alpha} 2^{-\frac{B_{k,n(i)}}{M-1}}} \triangleq \Omega_k.$$

Now, we formulate the feedback bit allocation problem for the k-th user as following Equation 9.

$$B_{k,n(i)}^{real} = \arg \max_{B_{k,n(i)} \in [0, B_k^t]} \Omega_k \text{ for } i = 1, 2, \ldots, K \quad \text{[Equation 9]}$$

Regarding to Equation 9, $B_{k,n(i)}^{real}$ is a real value. Next, we propose new bit allocation algorithm for two cases of K=2 ad K≥3. While a closed form solution is obtained for K=2, we need an iterative method which solves K−1 fixed point equations for K≥3.

5.2 K=2 Case

For K=2, we propose a closed form solution to obtain the optimal feedback bits which maximize the cost function. We present the following lemma on the optimal feedback bits.

Lemma 3: The cost function $\Omega_k$ is concave with respect to $B_{k,n(k)}$, and the optimal feedback bits are obtained by Equation 10 as following:

$$B_{k,n(k)}^{real} = (M-1)\log_2\left(1 + \sqrt{1 + \frac{\sigma_n^2}{PMd_{n(k),k}^{-\alpha}} 2^{\frac{B_k^t}{M-1}}}\right) \quad \text{[Equation 10]}$$

$$B_{k,n(k)}^* = \lceil B_{k,n(k)}^{real} \rceil$$

$$B_{k,n(\overline{k})}^* = B_k^t - B_{k,n(k)}^*.$$

Where if $l \leq 2$, $\overline{k}=1$, otherwise $\overline{k}=2$, and $\lceil \cdot \rceil$ denotes the round operation.

The second partial derivative of $\Omega_k$ with respect to $B_{k,n(k)}$ is represented as Equation 11.

$$\frac{\partial^2 \Omega_k}{\partial B_{k,n(k)}^2} = \frac{u_k - v_k}{\left(\sigma_n^2 + PMd_{n(k),k}^{-\alpha} 2^{-\frac{B_k^t - B_{k,n(k)}}{M-1}}\right)^4} \quad \text{[Equation 11]}$$

By using Equation 11, we can have $$u_k = -\frac{PMd_{n(k),k}^{-\alpha} \ln^2 2}{(M-1)^2}\left(\sigma_n^2 2^{-\frac{B_{k,n(k)}}{M-1}} + PMd_{n(\overline{k}),k}^{-\alpha} 2^{-\frac{B_k^t - B_{k,n(k)}}{M-1}}\right)$$

$$\left(\sigma_n^2 + PMd_{n(\overline{k}),k}^{-\alpha} 2^{-\frac{B_k^t - B_{k,n(k)}}{M-1}}\right)^2,$$

and $$v_k = \frac{2P^2M^2 d_{n(k),k}^{-\alpha} d_{n(\overline{k}),k}^{-\alpha} \ln^2 2}{(M-1)^2}\left(\sigma_n^2 + PMd_{n(\overline{k}),k}^{-\alpha} 2^{-\frac{B_k^t - B_{k,n(k)}}{M-1}}\right) \times$$

$$\left(\sigma_n^2 2^{-\frac{B_{k,n(k)}}{M-1}} + PMd_{n(\overline{k}),k}^{-\alpha}\left(2^{1-\frac{B_k^t}{M-1}} - 2^{-\frac{B_k^t - B_{k,n(k)}}{M-1}}\right)\right) 2^{-\frac{B_k^t - B_{k,n(k)}}{M-1}}.$$

Since $u_k<0$ and $v_k>0$, $\Omega_k$ is a concave function with respect to $B_{k,n(k)}$. Therefore, the maximum value of Equation 9 is achieved either at the critical point of $$\frac{\partial \Omega_k}{\partial B_{k,n(k)}} = 0,$$

or at the boundary points.

The partial derivative of $\Omega_k$ with respect to $B_{k,n(k)}$ is given as following Equation 12.

[Equation 12]

$$\frac{\partial \Omega_k}{\partial B_{k,n(k)}} = \frac{PMd_{n(k),k}^{-\alpha} \ln 2\left(\sigma_n^2 2^{-\frac{B_{k,n(k)}}{M-1}} + PMd_{n(\overline{k}),k}^{-\alpha}\left(2^{1-\frac{B_k^t}{M-1}} - 2^{-\frac{B_k^t - B_{k,n(k)}}{M-1}}\right)\right)}{(M-1)\left(\sigma_n^2 + PMd_{n(\overline{k}),k}^{-\alpha} 2^{-\frac{B_k^t - B_{k,n(k)}}{M-1}}\right)^2}$$

Then, by equating $$\frac{\partial \Omega_k}{\partial B_{k,n(k)}} = 0,$$

the optimal feedback bits are computed by equation 10. Since $B_{k,n(k)}^{real}$ may not be an integer value, we obtain $B^*_{k,n(k)}$ by $\lceil B_{k,n(k)}^{real} \rceil$.

Observing Equation 10, if the transmit power is high and the distance between real users and DA ports are fixed, $B_{k,n(k)}^{real}$ converges to 0. This means that the feedback bits are mostly allocated to the interference channel in the interference limited regime, while a user may allocated bits to the desired channel in the noise limited regime. Also, if $d_{n(\overline{k}),k}$ is a small value, the interference power becomes large, and thus many bits are allocated to the interfering channel.

5.3 K≥3 case

When K becomes greater than 2, we cannot simply determine the number of feedback bits since Equation 9 is a coupled problem, i.e. $B_{k,n(1)}$, $B_{k,n(2)}$, . . . , and $B_{k,n(K)}$ affect with each other. Thus, for K≥3, we propose an iterative method which solves K−1 fixed point equations in order to obtain the optimal feedback bits. First, we prove the concavity of the cost function. For the k-th user, the second partial derivative of the cost function with respect to $B_{k,n(i)}$ for $i \neq k$ is written as Equation 13.

$$\frac{\partial^2 \Omega_k}{\partial B_{k,n(i)}^2} = \frac{u_{k,i} - v_{k,i}}{\left(y_{k,i} + x_{k,i} 2^{-\frac{B_{k,n(i)}}{M-1}}\right)^4} \quad \text{[Equation 13]}$$

-continued

Where $$u_{k,i} = -\frac{PM d_{n(k),k}^{-\alpha} \ln^2 2}{(M-1)^2}\left(y_{k,i} + x_{k,i}2^{-\frac{B_{k,n(i)}}{M-1}}\right)^2$$

$$\left(2^{-\frac{B_k^t - \alpha_{k,i} - B_{k,n(i)}}{M-1}} + x_{k,i}2^{-\frac{B_{k,n(i)}}{M-1}}\right),$$

$$v_{k,i} = \frac{2PM d_{n(k),k}^{-\alpha} x_{k,i} \ln^2 2}{(M-1)^2} 2^{-\frac{B_{k,n(i)}}{M-1}}\left(y_{k,i} + x_{k,i}2^{-\frac{B_{k,n(i)}}{M-1}}\right)$$

$$\left\{2^{-\frac{B_k^t - \alpha_{k,i} - B_{k,n(i)}}{M-1}} + x_{k,i}\left(1 + 2^{-\frac{B_k^t - \alpha_{k,i}}{M-1}} - 2^{-\frac{B_{k,n(i)}}{M-1}}\right)\right\},$$

$$x_{k,i} = PM d_{n(i),k}^{-\alpha}, \quad y_{k,i} = \sigma_n^2 + \sum_{l\neq k, l\neq i}^{K} PM d_{n(l),k}^{-\alpha} 2^{-\frac{B_{k,n(l)}}{M-1}},$$

and $a_{k,i}$ denotes the total number of feedback bits excepted for the feedback bits for the desired link and the i-th interfering link, i.e., $\alpha_{k,i} = \Sigma_{l\neq k, l\neq i}^{K} B_{k,n(l)}$. Since $u_{k,i}<0$, $v_{k,i}>0$, and $$\frac{\partial^2 \Omega_k}{\partial B_{k,n(i)}^2}$$

is always a negative value, and thus $\Omega_k$ is a concave function with respect to $B_{k,n(i)}$ for $i\neq k$. Therefore, the maximum value of Equation 9 is obtained either at the critical point of $$\frac{\partial \Omega_k}{\partial B_{k,n(i)}} = 0$$

or at the boundary points.

5.3.1 Lemma 4

For the k-th user, when $a_{k,i}$ is given, the optimal feedback bits are determined by following Equation 14.

$$B_{k,n(i)}^{real} = (M-1)\log_2 z_{k,i} \text{ for } i = 1, 2, \ldots, K \text{ and} \quad \text{[Equation 14]}$$
$$i \neq k$$

$$B_{k,n(i)}^* = \lceil B_{k,n(i)}^{real} \rceil$$

$$B_{k,n(k)}^* = B_k^t - \sum_{i\neq k}^{K} B_{k,n(i)}^*,$$

where $$z_{k,i} = \frac{-x_{k,i} + \sqrt{x_{k,i}\left(x_{k,i} + y_{k,i}2^{-\frac{B_k^t - \alpha_{k,i}}{M-1}}\right)}}{y_{k,i}}$$

The partial derivative of cost function with respect to $B_{k,n(i)}$ for $i\neq k$ is expressed as $$\frac{\partial \Omega_k}{\partial B_{k,n(i)}} =$$

-continued $$\frac{PM d_{n(k),k}^{-\alpha} \ln 2\left(x_{k,i}2^{-\frac{B_{k,n(i)}}{M-1}} - 2x_{k,i}2^{-\frac{B_k^t - \alpha_{k,i}}{M-1}} - y_{k,i}2^{-\frac{B_k^t - \alpha_{k,i} - B_{k,n(i)}}{M-1}}\right)}{(M-1)\left(y_{k,i} + x_{k,i}2^{-\frac{B_{k,n(i)}}{M-1}}\right)^2}.$$

By equating $$\frac{\partial \Omega_k}{\partial B_{k,n(i)}} = 0,$$

the optimal feedback bits are obtained by Equation 14.

The above lemma 4 produces the optimal number of feedback bits from the k-th user to the n(i)-th DA port, while the feedback bits for all the other links are fixed. Thus, when the feedback bits $B_{k,n(i)}$ are determined from Equation 14, this affects the solution for other channel links. As a result, we need an iterative procedure until a converged solution is found. To this end, we first initialize $B_{k,n(i)}$ for i=1, 2, ..., K, and i≠K. Then, we compute $a_{k,i}$ and update $B^*_{k,n(i)}$ for i=1, 2, ..., K, and i≠K. Finally, we compute the optimal feedback bits by solving K−1 fixed point equations, and repeat this process. The proposed algorithm is summarized as following Table 1.

TABLE 1 for k = 1 : K
  (1) Initialize $B_{k,n(i)}$ for i = 1, 2, ..., K and i ≠ k
  (2) Obtain $B_{k,n(i)}^{real}$ = (M − 1) $\log_2 z_{k,n(i)}$ for i = 1, 2, ..., K and i ≠ k
  (3) Update $B_{k,n(i)}^*$ = $\lceil B_{k,n(i)}^{real} \rceil$
  (4) Repeat (2)-(3) until convergence
  (5) Obtain $B_{k,n(k)}^*$ = $B_k^t$ − $\Sigma_{i\neq k}^K B_{k,n(i)}^*$
end It is important to note that our proposed bit allocation algorithm is only a function of the transmit power and distance, and thus it does not depend on channel realization.

6. Exhaustive Search

For both desired channels and interfering channels, we can obtain the optimal feedback bits which maximize the average sum rate by using exhaustive search for each channel realization. However, computational complexity for the exhaustive search is much higher compared to the proposed algorithm. Here, we will compare the computational complexity of the proposed algorithm and the exhaustive search. We assume that $\hat{h}_{n(i),k}$ and $d_{n(i),k}^{-\alpha}$ for all i and k are given. Also, we neglect the multiplication operations for computing $\log_2 a$ and $2^a$.

The required multiplications for determining each user's beam-forming vector and the individual user rate are $O(M^3)$+$O(KM^2)$ and $O(KM)$, respectively, since a matrix inversion and eigen-value decomposition need $O(M^3)$ multiplications. Considering $B_k^t = B^t$ for all k, the exhaustive search requires $O(KM^3(B^t)^K) + O(K^2M^2(B^t)^K) + O(K^2M(B^t)^K)$ multiplication, since we should compare the sum rate for every cases and choose the largest one. Thus, for large $B^t$ and K, the computational complexity may become prohibitive. In contrast, the proposed algorithm requires only $O(\beta K^3)$ multiplications where $\beta$ is the number of iterations until Equation 14 converged, since we need O(K) multiplications for computing $B_{k,n(i)}^{real}$. As a result, the proposed scheme can substantially reduce the complexity of the exhaustive search. We will show in the simulation section that the performance of our proposed scheme is very close to that of the exhaustive search. Also, the complexity advantage for our algorithm grows as K, M and $B^t$ increase.

7. Simulation Results

In this section, simulation results are presented to demonstrate the efficacy of our proposed algorithms. In the simulation, the cell radius and the path loss exponent are set to R=1 and α=3:75, respectively. Also, SNR is defined as $P/\sigma_n^2$. The beamforming vector which maximizes SLNR is employed and RVQ is applied for quantizing the channel direction vector of small scale fading. We consider that all users have the same number of total feedback bits and locations of DA ports.

Figure 19:
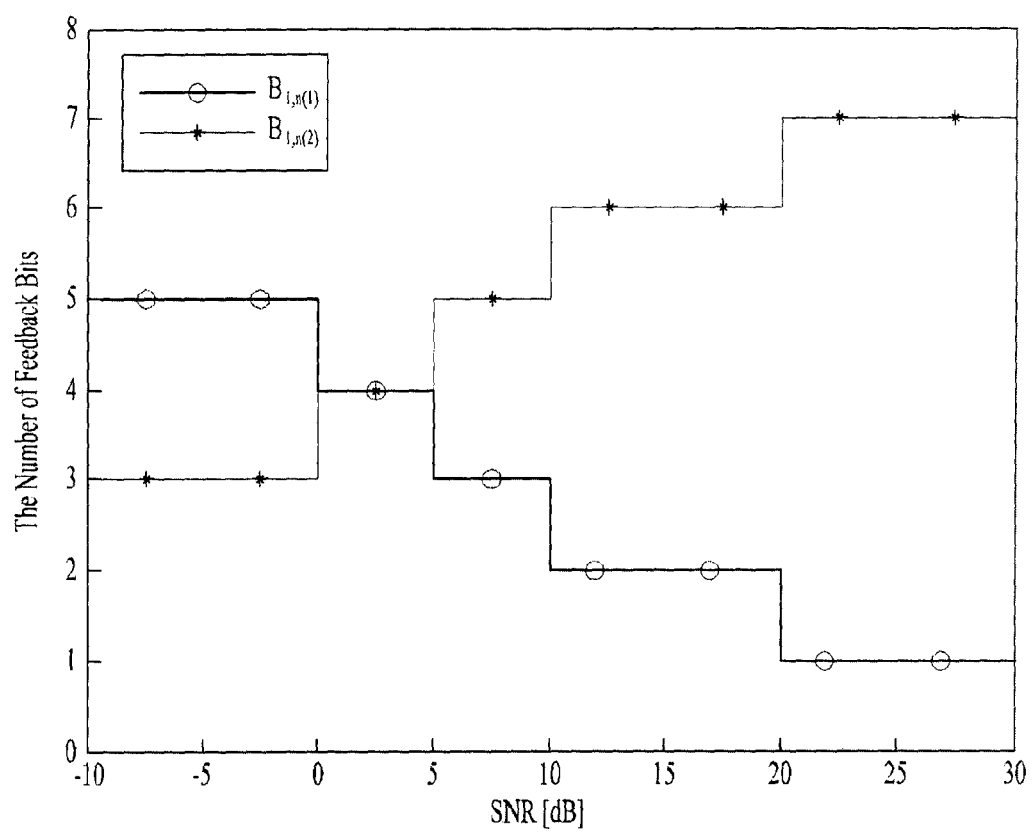
FIG. 19 illustrates a feedback bit allocation with respect to SNR for two-user DAS according to an embodiment of the present invention.

We also assume that all users have fixed locations for FIGS. 18 to 21. First, we consider the fixed locations of DA ports and users for DAS depicted in FIG. 18. The asterisks and the circles indicate the locations of DA ports and users, respectively. Here, users are symmetrically located at the cell center. In this environment, FIG. 19 plots the number of allocated bits for user 1 with respect to SNR with $B_k^t=8$. We confirm that more bits are allocated for the desired channel link at low SNR, i.e. the noise limited regime, while more CSI for the interfering channel link is required in order to reduce interference as SNR increases.

Figure 20:
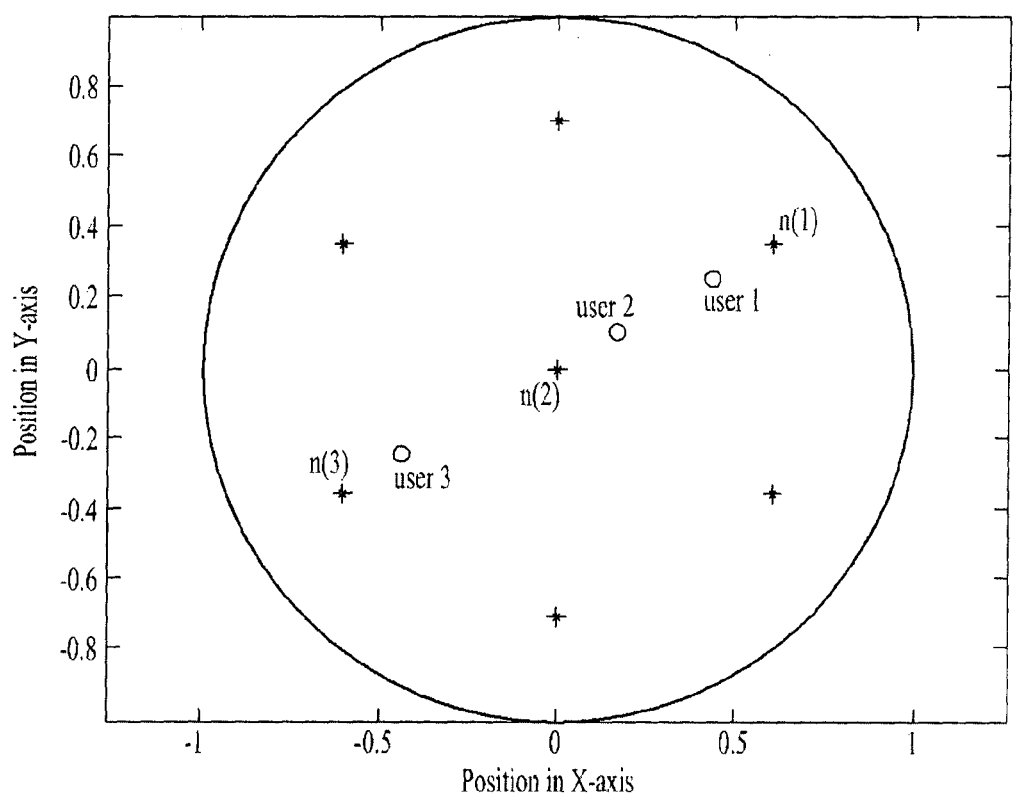
FIG. 20 illustrates another deployment of DA ports and UEs, which is applicable to the embodiments of the present invention.
Figure 21:
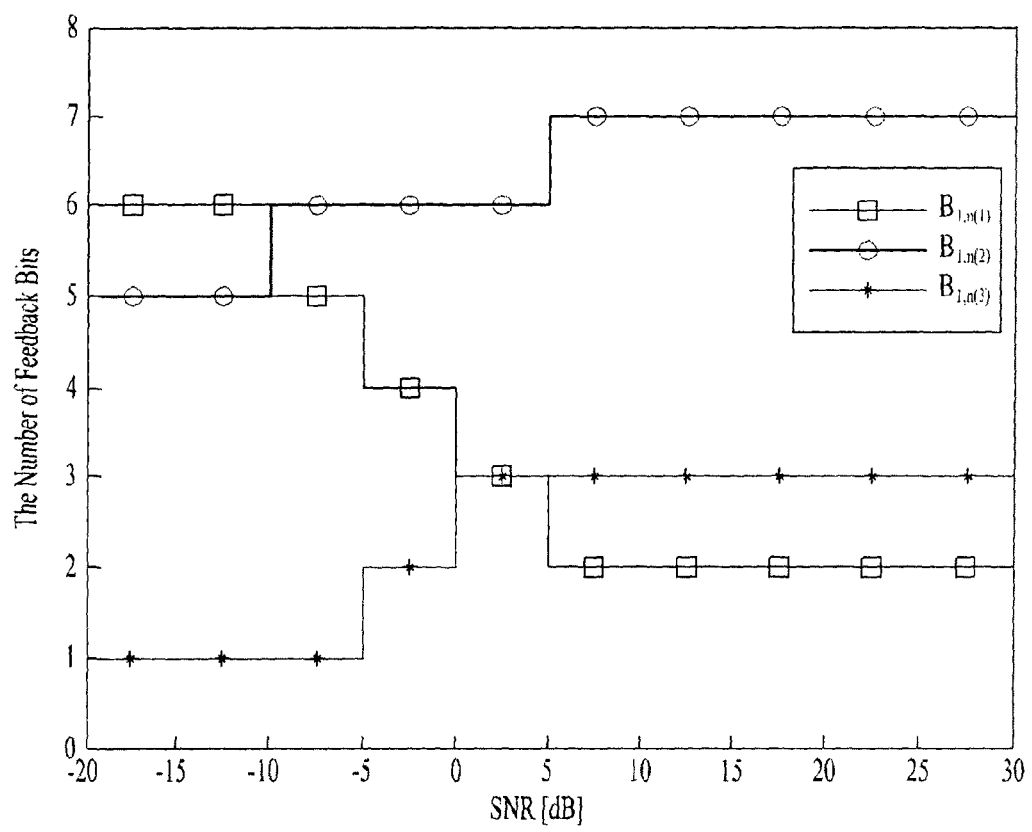
FIG. 21 illustrates a feedback bit allocation with respect to SNR for three-user DAS according to an embodiment of the present invention.

In FIG. 20, the locations of DA ports and users for DAS with K=3, N=7 and M=2 are illustrated. Since each user selects the nearest DA port, n(k) for k=1, 2, and 3 are determined as shown in FIG. 20. Based on this configuration, FIG. 21 shows the results of the feedback bits assigned to user 1. The allocated feedback bits can be determined with only 2 to 4 iterations by applying the proposed algorithm. Similar to the two-user case, more bits are allocated to the desired channel link at low SNR, while the number of bits for the interference channel links increases in the interference limited regime, i.e. high SNR. Also, there are more bits for $B_{1,n(2)}$ than $B_{1,n(3)}$, since the interference power from the n(2)-th DA port is much higher.

Figure 22:
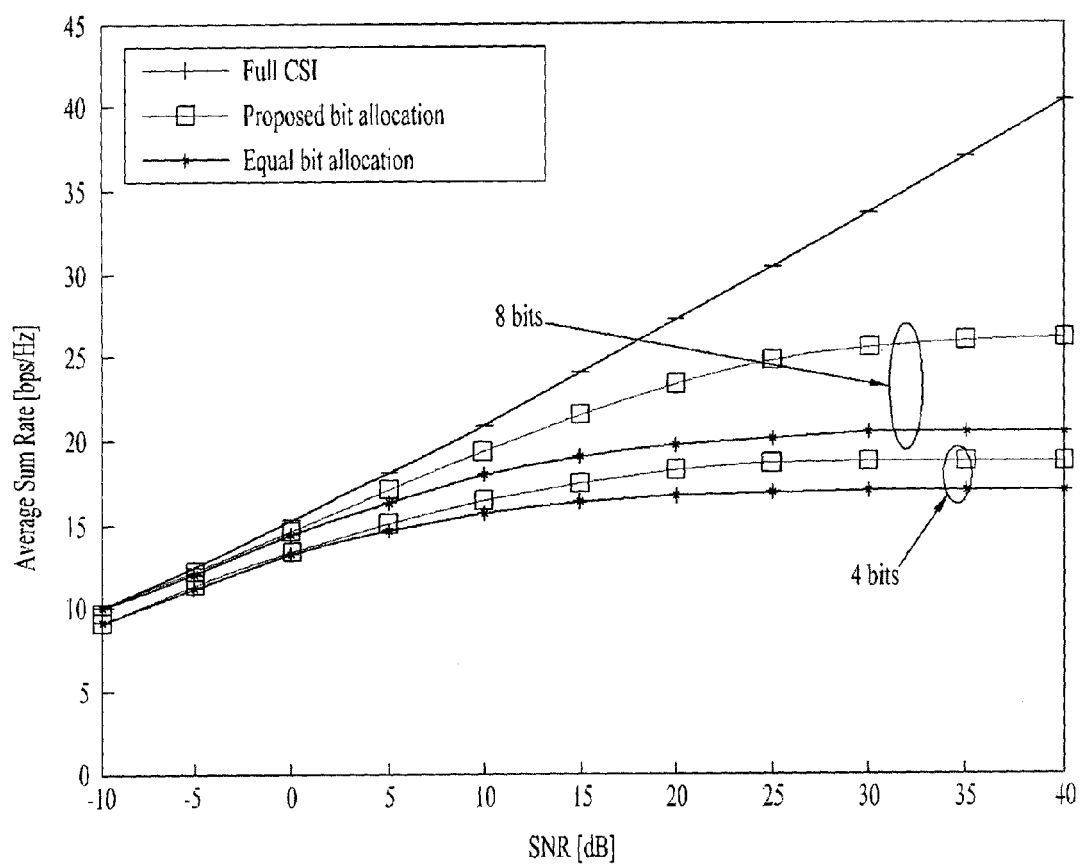
FIG. 22 illustrates a result of average sum rate with two users according to an embodiment of the present invention.

Next, we consider a system where all users are uniformly distributed in a cell. In FIG. 22, we present the average sum rate curves as a function of SNR for DAS with K=2, N=7 and M=2. Referring to FIG. 22, full CSI means perfect knowledge of the linked channel at the transmitter and equal bit allocation indicates that feedback bits for the desired channel and the interfering channel are equally allocated, i.e.

$$B_{k,n(1)} = B_{k,n(2)} = \frac{B_k^t}{2}$$

for al k. At SNR=40 dB, the proposed bits allocation has performance gains of 10% and 27% over the equal bit allocation for $B_k^t=4$ and 8, respectively. The simulation results show that the closed form Equation 10 enhances the average sum rate compared to the equal bit allocation.

Figure 23:
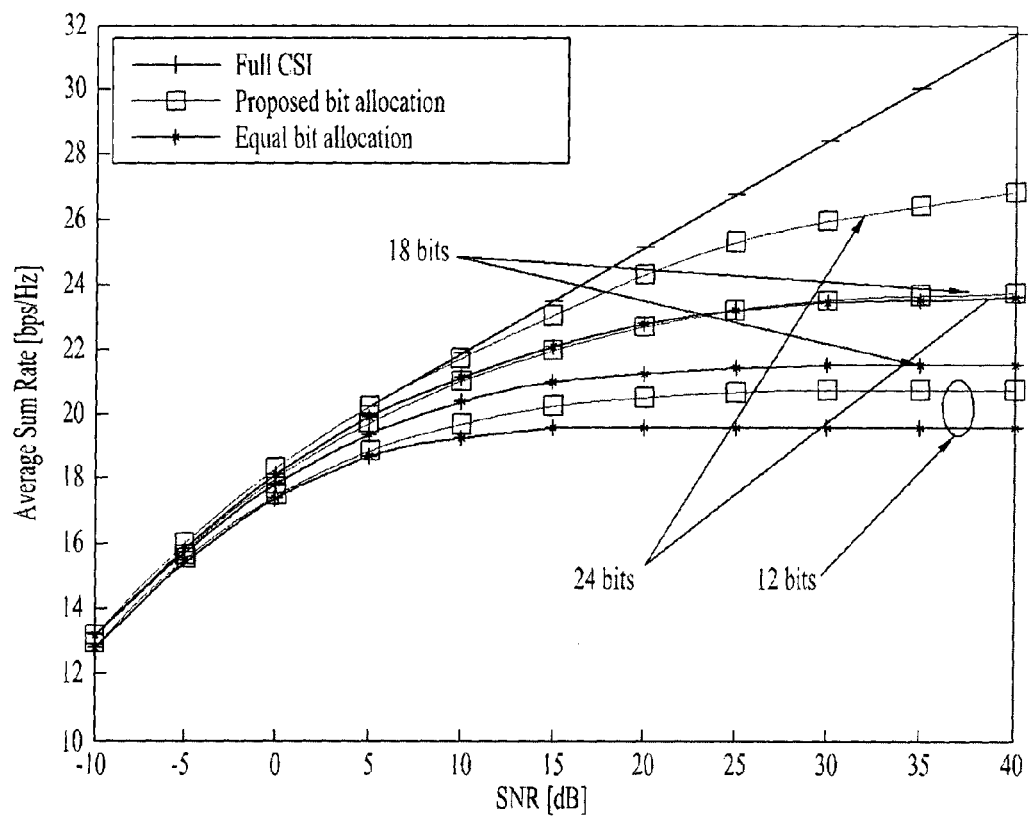
FIG. 23 illustrates a result of average sum rate with three users according to an embodiment of the present invention.

Referring to FIG. 23, we illustrate the average sum rate curves as a function of SNR with K=3, N=7 and M=2. For the equal bit allocation, we have $$B_{k,n(i)} = \frac{B_k^t}{3}$$

for all k and i=1, 2, and 3. When $B_k^t=24$ at SNR=40 dB, the proposed bit allocation provides a 14% gain compared to the equal bit allocation scheme. Also, the performance of the proposed algorithm with $B_k^t=18$ is the almost same as that of the equal bit allocation with $B_k^t=24$. In this case, note that we can save the amount of bit by up to 25%. In addition, similar to the two-user case, an average sum rate gain over the equal bit allocation increases as the number of total feedback bits grows.

Figure 24:
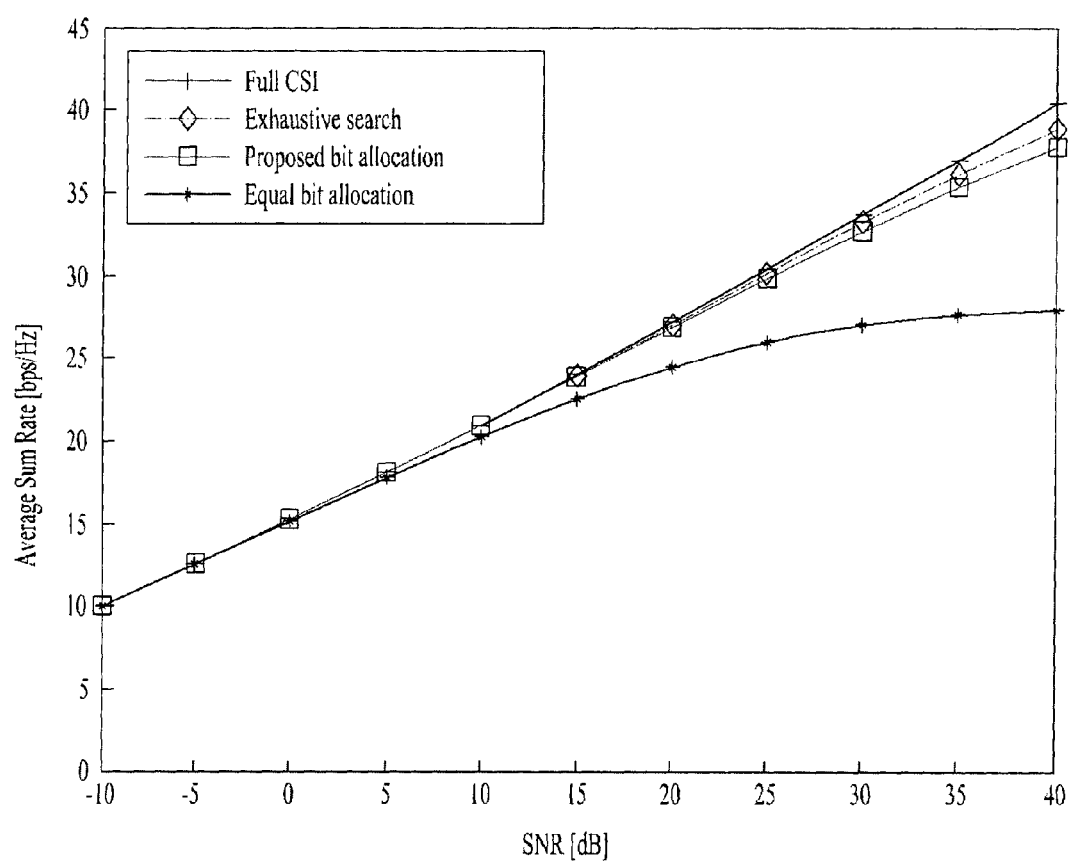
FIG. 24 illustrates a result of average sum rate with two users related to exhaustive search according to an embodiment of the present invention.

Referring to FIG. 24, we plot the average sum rate curves as a function of SNR with $B_k^t=16$ when K=2. FIG. 24 shows that the performance of our proposed algorithm is quite close to the full CSI case and the exhaustive search case. Note that the exhaustive search needs much higher computational complexity than our algorithm as discussed in Section 6. Also, the DAS with the proposed feedback bit allocation exhibits an average sum rate gain of 35% compared to the equal bit allocation scheme at SNR=40 dB.

Figure 25:
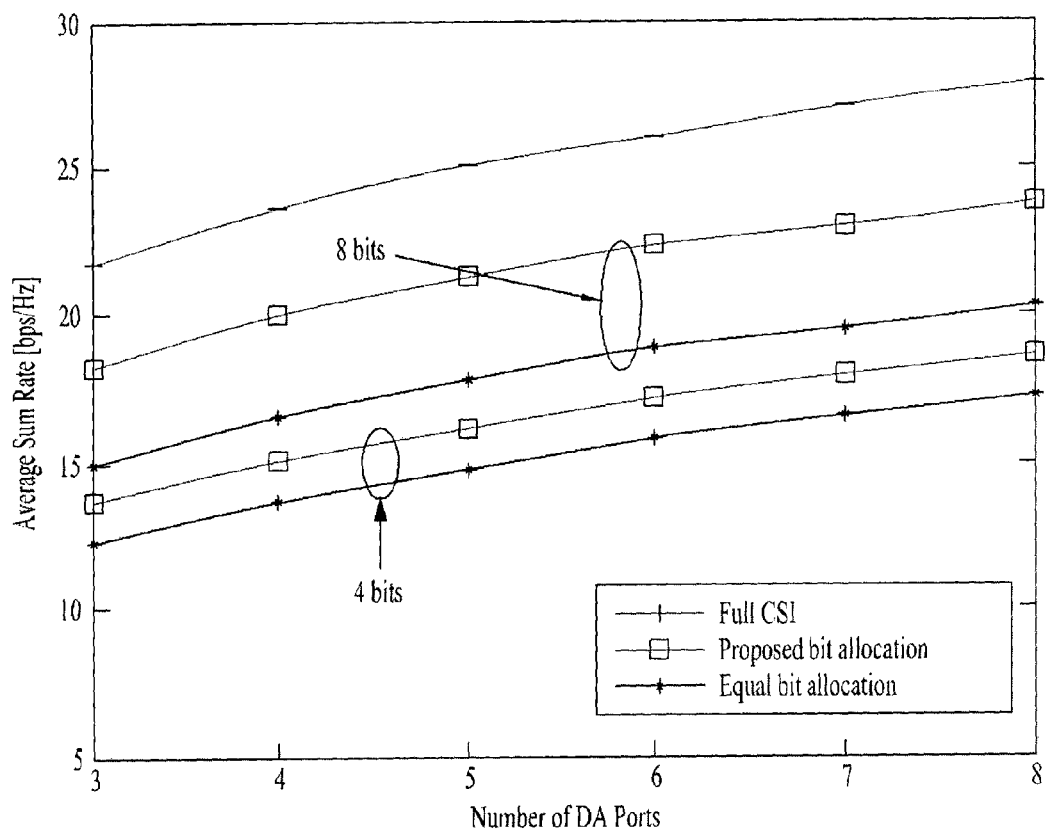
FIG. 25 illustrates a result of average sum rate with SNR=20 dB according to an embodiment of the present invention.

Referring to FIG. 25, the average sum rate curves as a function of the number of DA ports are exhibited with K=2 and M=2 at SNR=20 dB. As the number of DA ports increases, the average sum rates are improved for all cases. When N=8, the proposed bit allocation shows performance gains of 9% and 18% over the equal bit allocation for $B_k^t=4$ and 8, respectively. Also, we can see that a rate loss of the proposed bit allocation with $B_k^t=8$ remains small with respect to the full CSI case for all cases. As $B_k^t$ increases, a performance gain of the proposed algorithm over the equal bit allocation grows and the performance becomes close to the full CSI case and the optimum case with the exhaustive search.

As discussed above, the Applicant has proposed a new algorithm which allocates the feedback bits for the multi-user downlink DAS with limited feedback in a single-cell environment for the composite fading channel model. In order to enhance the average sum rate for the limited feedback DAS, we first derive a lower bound of the expected SINR and obtain an adaptive method for allocating feedback bits for both the desired channel and the interfering channels. For K=2, we have presented an algorithm with a closed form solution. Also, for K≥3, we have proposed an iterative algorithm which solves K−1 fixed point equations. The proposed algorithms allocate different feedback bits according to SNR and the distance between DA ports and users. The simulation results confirm that the DAS with the proposed bit allocation algorithm offers a large performance gain over the equal bit allocation scheme and the performance is quite close to the full CSI case and the exhaustive search with much reduced complexity.

Figure 26:
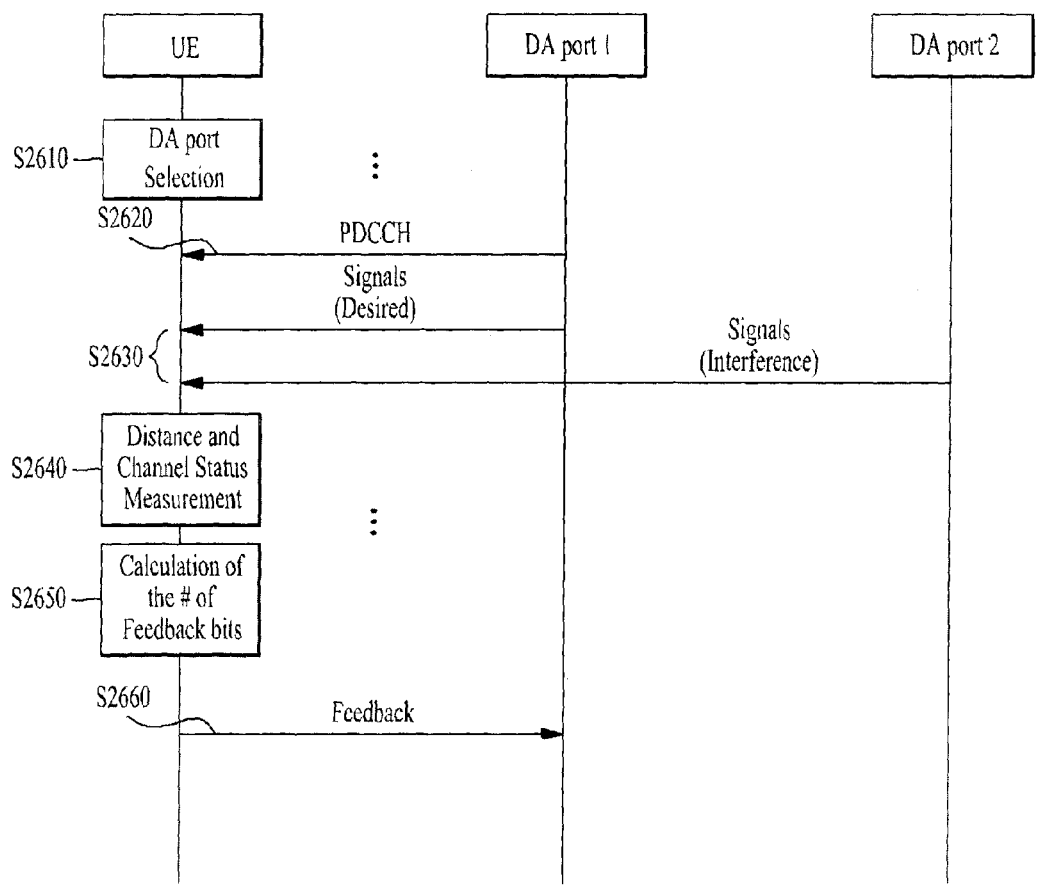
FIG. 26 illustrates a method for allocating feedback bits according to embodiments of the present invention.

FIG. 26 illustrates a method for allocating feedback bits according to embodiments of the present invention.

Referring to FIG. 26, the distributed antenna system (DAS) comprises a user equipment (UE), a first base station and a second base station. In this case, the system model of DAS can be referred to FIG. 17, and the UE is the same entity of the user and the first/second base stations can be the DA port 1/2, respectively.

The UE selects nearest DA port (i.e., DA port 1) among the DA ports deployed in a single cell (S2610).

At the step S2610, when one or more UEs select the same DA port (DA port 1), only the nearest UE from the DA can be supported, and the remaining UEs who has not yet select a DA port will choose the next nearest DA port.

The DA port 1 transmits information related to a transmission power and information related to the number of transmission antennas through a PDCCH signal. In addition, the DA port 1 may also transmit information of the other DA ports such as, information of a transmission power and information of the number of transmission antennas of the other DA ports (e.g., DA port 2, 3, . . . 7) (S2620).

In addition, the DA port 1 transmits signals, such as downlink data to the UE. At that time, the other DA port (i.e., DA port 2) transmits signals to the other UE but this signals act as interference to the UE because the DA port 2 is not the port selected by the UE. The received signal can be expressed as Equation 1 (S2630).

The UE can measure a distance between the UE and the DA port 1, and distances between the UE and the other DA ports (e.g., DA port 2). In this case, the UE measures the distance by using a RSS (Received Signal Strength) scheme based on the ToA (Time of Arrival). In addition, the UE measures channel status of the downlink channel between the UE and the DA port 1 and channel status among the UE and the other DA ports (e.g., the DA port 2) (S2640).

The distance between the UE and the DA ports (1, 2, ..., 7) can be measured at the step S2610 when the UE has selected the DA port 1, instead of step S2640. In this case, the UE can measure the channel status of the DA ports.

After that, the UE calculates the number of feedback bits by using method described sections 3 to 5, Equations 2 to 14, and Table 1. For example, the UE calculates the number of the feedback bits based on the information of the transmission power and the information of the distance between the UE and the DA ports (see, S2620 and S2640). In this case, the feedback bits consist of bits for the DA port 1 and bits for the interference for other DA ports (S2650).

Finally the UE transmits feedback information using calculated the feedback bits. The UE may feedback not only the channel status information (CSI) between the UE and the DA port 1 but also the CSI between the UE and the DA port 2. That is, a part of the calculated feedback bits is used for transmission of the CSI for the DA port 1 and the other part of the feedback bits are used for transmission of the CSI for the DA port 2. In this case, the feedback method which is used by the UE can be referred to the method described FIGS. 2 to 16 (S2660).

According to another aspect of the present invention, at the step of S2640, the UE can measure the channel status only without the distance, and feeds back it to the DA port 1. In this case, the DA port 1 can calculate the number of feedback bits to be used for transmitting feedback information and then the DA port 1 transmits the information of the number of feedback bits to the UE. After that, the UE can transmit the feedback information by using the allocated feedback bits.

8. Apparatuses for Implementing the Aforementioned Methods

Figure 27:
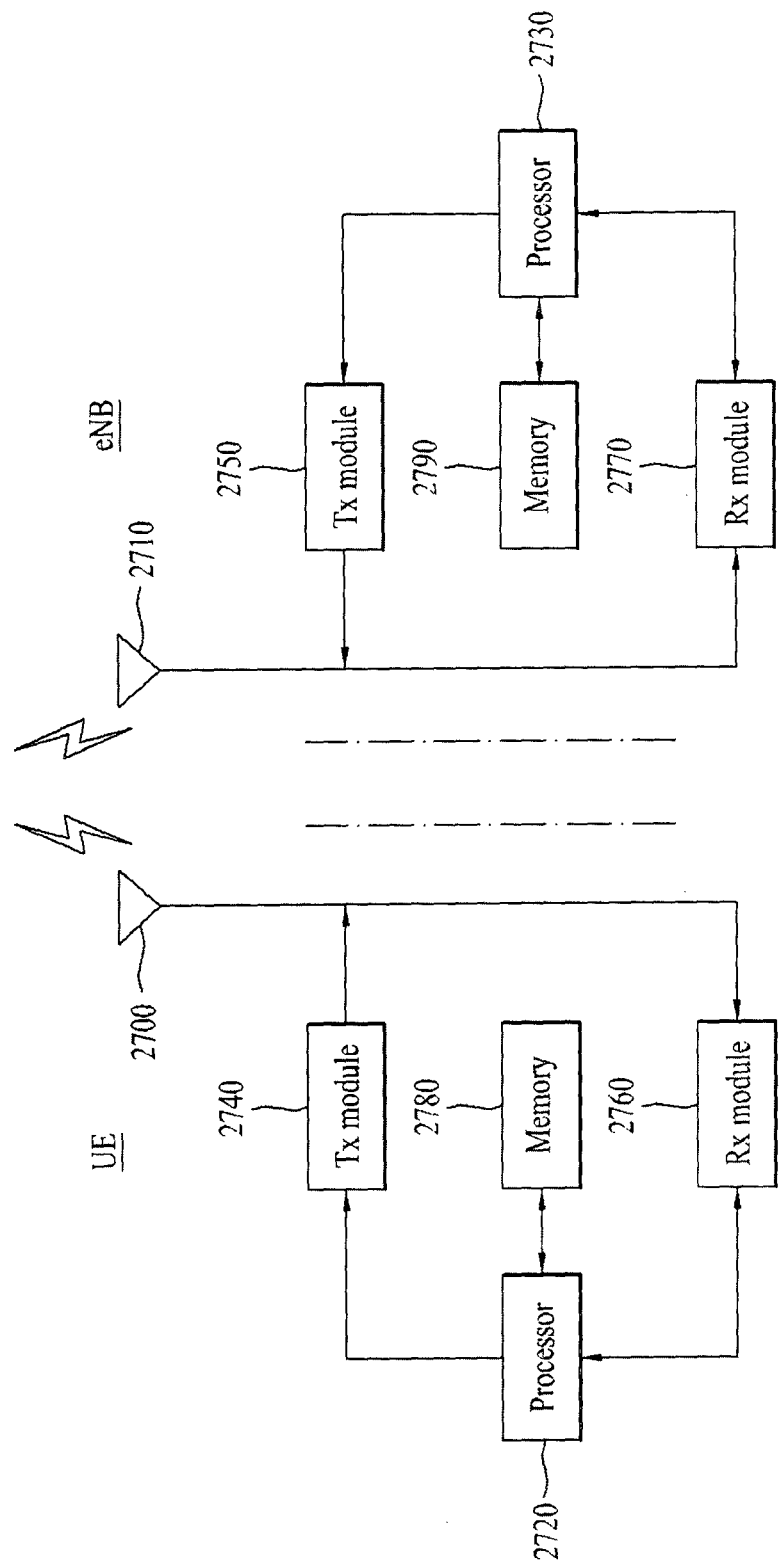
FIG. 27 shows apparatuses for implementing the above-mentioned methods described with reference to FIGS. 1 to 26.

FIG. 27 shows apparatuses for implementing the above-mentioned methods described with reference to FIGS. 1 to 26.

A UE can serve as a transmitter on uplink and as a receiver on downlink. An eNB can serve as a receiver on uplink and as a transmitter on downlink.

The UE and the eNB may include transmission modules (Tx modules) 2740 and 2750 and reception modules (Rx modules) 2760 and 2770 for controlling transmission and reception of data and/or messages and antennas 2700 and 2710 for transmitting and receiving information, data and/or messages, respectively.

In addition, the UE and the eNB may respectively include processors 2720 and 2730 for performing the above-described embodiments of the present invention and memories 2870 and 2790 for storing processing procedures of the processors temporarily or continuously.

The embodiments of the present invention can be performed using the aforementioned components and functions of the UE and the eNB. The apparatuses shown in FIG. 27 may further include the components shown in FIGS. 2, 3 and 4. The processors 2720 and 2730 preferably include the components shown in FIGS. 2, 3 and 4.

The processor 2720 of the UE can monitor a search space to receive a PDCCH signal. Particularly, an LTE-A UE can receive a PDCCH signal without blocking PDCCH signals transmitted to other LTE UEs by performing blind decoding on an extended CSS.

The processor 2720 of the UE can measure the distance between the UE and the DA port and the channel status between them. In addition, the UE can calculate the number of feedback bits for transmitting feedback information. Accordingly, the UE transmit UCI with a PUSCH signal or PUCCH signal to the eNB.

The transmission modules 2740 and 2750 and the reception modules 2760 and 2770 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

What is claimed is:

1. A method for optimizing limited feedback in a wireless access system supporting a distributed antenna (DA) technique, the method comprising:
- receiving, at a user equipment (UE) from a DA port through a physical downlink control channel (PDCCH), information related to transmission power of a number of DA ports including the DA port and a number of transmission antennas of the DA ports;
- receiving a downlink signal from each of the DA ports;
- measuring a distance between the UE and each of the DA ports using a downlink signal from each of the DA ports;
- calculating a number of feedback bits based on the information related to the transmission power, the number of transmission antennas, and the distance between the UE and the DA ports; and
- transmitting feedback information using the calculated number of feedback bits.

2. The method according to claim 1, wherein the number of feedback bits is a fixed value in the wireless access system.

3. The method according to claim 1, further comprising:
- measuring channel status information between the UE and the DA ports,
- wherein the channel status information is transmitted using the number of feedback bits.

4. A method for optimizing limited feedback in a wireless access system supporting a distributed antenna (DA) technique, the method comprising:
- transmitting, from a DA port to a user equipment (UE) through a physical downlink control channel (PDCCH), information related to transmission power of a number of DA ports including the DA port and a number of transmission antennas of the DA ports;
- transmitting a downlink signal to the UE; and
- receiving feedback information transmitted with a fixed number of feedback bits,
- wherein the fixed number of feedback bits is calculated based on information of distance between the UE and each of the DA ports, the number of transmission antennas, and the information related to the transmission power of each of the DA ports.

5. The method according to claim 4, wherein the feedback information comprises channel status information between the UE and the DA ports.

6. A user equipment (UE) for supporting an optimization of limited feedback in a wireless access system which supports a distributed antenna (DA) technique, the UE comprising:
- a transmission module;
- a reception module; and
- a processor for performing limited feedback,
- wherein the processor is configured to:
- receive, via the reception module from a DA port through a physical downlink control channel (PDCCH), information related to transmission power of a number of DA ports including the DA port and a number of transmission antennas of the DA ports;
- receive a downlink signal from each of the DA ports by using the reception module,
- measure a distance between the UE and each of the DA ports using the downlink signal from each of the DA ports;
- calculate a number of feedback bits based on the information related to the transmission power, the number of transmission antennas, and the distance between the UE and the DA ports; and
- transmit, via the transmission module to the DA port, feedback information using the calculated number of feedback bits.

7. The method according to claim 6, wherein the number of feedback bits is a fixed value in the wireless access system.

8. The method according to claim 6, wherein the processor is further configured to:
- measure channel status information between the UE and the DA ports,
- wherein the channel status information is transmitted using the number of feedback bits.

* * * * *